US012675189B2

(12) United States Patent
Vukovic

(10) Patent No.: US 12,675,189 B2
(45) Date of Patent: Jul. 7, 2026

(54) PSEUDOINVERSE-BASED NOISE EQUALIZATION

(71) Applicant: Microchip Touch Solutions Limited, Wokingham (GB)

(72) Inventor: Predrag D. Vukovic, Winchester (GB)

(73) Assignee: Microchip Touch Solutions Limited, Wokingham (GB)

( * ) Notice: Subject to any disclaimer, the term of this patent is extended or adjusted under 35 U.S.C. 154(b) by 0 days.

(21) Appl. No.: 18/498,425

(22) Filed: Oct. 31, 2023

(65) Prior Publication Data

US 2024/0143111 A1 May 2, 2024

Related U.S. Application Data

(60) Provisional application No. 63/381,718, filed on Oct. 31, 2022.

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC ...... G06F 3/0418; G06F 3/0446; G06F 30/20; G01R 31/385; G01R 31/367; B60L 58/10; H01M 10/42; Y02E 60/10
USPC ............................. 324/500, 600, 76.11, 612
See application file for complete search history.

(56) References Cited

U.S. PATENT DOCUMENTS

| | | | | |
|---|---|---|---|---|
| 6,370,191 B1 * | 4/2002 | Mahant-Shetti | ........ | G06F 7/552 |
| | | | | 375/233 |
| 6,483,866 B1 * | 11/2002 | Suzuki | ................. | H04B 7/0851 |
| | | | | 375/150 |
| 7,894,516 B2 * | 2/2011 | Liang | ................ | H04L 25/03057 |
| | | | | 375/232 |
| 8,928,624 B2 | 1/2015 | Singh et al. | | |
| 9,606,663 B2 * | 3/2017 | Yousefpor | ........... | G06F 3/04166 |
| 9,864,463 B2 | 1/2018 | Vukovic et al. | | |
| 10,804,945 B1 * | 10/2020 | Ram | ..................... | H04B 1/123 |
| 2010/0060591 A1 | 3/2010 | Yousefpor et al. | | |
| 2015/0153868 A1 | 6/2015 | Tiew | | |
| 2016/0006496 A1 * | 1/2016 | Schneider | ................ | H04B 3/54 |
| | | | | 375/267 |

(Continued)

FOREIGN PATENT DOCUMENTS

| | | |
|---|---|---|
| KR | 10-2021-0085811 A | 7/2021 |
| WO | 2012/003856 A1 | 1/2012 |

(Continued)

OTHER PUBLICATIONS

International Search Report of International Patent Application No. PCT/US2023/036532, mailed Apr. 9, 2024, 8 pages.

(Continued)

*Primary Examiner* — Huy Q Phan
*Assistant Examiner* — Trung Q Nguyen
(74) *Attorney, Agent, or Firm* — TraskBritt

(57) ABSTRACT

A method including obtaining a first single-ended measurement signal and a second single-ended measurement signal; and producing an equalized measurement signal at least partially based on a predetermined pseudoinverse channel matrix and one or more of: the first single-ended measurement signal and the second single-ended measurement signal.

20 Claims, 17 Drawing Sheets

(56) References Cited

U.S. PATENT DOCUMENTS

| | | | |
|---|---|---|---|
| 2019/0384441 A1 * | 12/2019 | Seo ....................... | G06F 3/0416 |
| 2020/0103993 A1 * | 4/2020 | Krah ................... | G06F 3/04182 |
| 2020/0150795 A1 * | 5/2020 | Park ................... | G01R 27/2605 |
| 2020/0373970 A1 * | 11/2020 | Ma ........................ | G06F 7/5446 |
| 2022/0155891 A1 | 5/2022 | Collins et al. | |

FOREIGN PATENT DOCUMENTS

| | | | |
|---|---|---|---|
| WO | 2012/041424 A1 | 4/2012 |
| WO | 2012/041425 A1 | 4/2012 |
| WO | 2016/085560 A1 | 6/2016 |

OTHER PUBLICATIONS

Written Opinion of the International Searching Authority of International Application No. PCT/US2023/036532, mailed Apr. 9, 2024, 9 pages.
Provisional Rejection of Korean Patent Application No. 10-2025-7013679, mailed Apr. 15, 2026, 21 pages with English translation.

* cited by examiner

100

DIFFERENTIAL MEASUREMENT SYSTEM PORTION 102

FIRST SINGLE-ENDED MEASUREMENT SIGNAL 108

SECOND SINGLE-ENDED MEASUREMENT SIGNAL 110

EQUALIZATION SYSTEM 104

PREDETERMINED PSEUDOINVERSE CHANNEL MATRIX 106

EQUALIZED MEASUREMENT SIGNAL 112

OBTAIN A FIRST SINGLE-ENDED MEASUREMENT SIGNAL AND A SECOND SINGLE-ENDED MEASUREMENT SIGNAL 502

PRODUCE AN EQUALIZED MEASUREMENT SIGNAL AT LEAST PARTIALLY BASED ON A PREDETERMINED PSEUDOINVERSE CHANNEL MATRIX AND ONE OR MORE OF: THE FIRST SINGLE-ENDED MEASUREMENT SIGNAL AND THE SECOND SINGLE-ENDED MEASUREMENT SIGNAL 504

SETTING COEFFICIENTS OF THE PREDETERMINED PSEUDOINVERSE CHANNEL MATRIX TO REDUCE CHANNEL EFFECTS 602

700

PRODUCING A SINGLE-ENDED MEASUREMENT INPUT SIGNAL AT LEAST PARTIALLY BASED ON A RELATIONSHIP BETWEEN THE FIRST SINGLE-ENDED MEASUREMENT SIGNAL AND THE SECOND SINGLE-ENDED MEASUREMENT SIGNAL 702

PRODUCING THE EQUALIZED MEASUREMENT SIGNAL AT LEAST PARTIALLY BASED ON THE PREDETERMINED PSEUDOINVERSE CHANNEL MATRIX AND SINGLE-ENDED MEASUREMENT INPUT SIGNAL 704

FIG. 7

800

PRODUCING A FIRST SINGLE-ENDED EQUALIZED MEASUREMENT SIGNAL AT LEAST PARTIALLY BASED ON THE FIRST SINGLE-ENDED MEASUREMENT SIGNAL AND A FIRST PREDETERMINED PSEUDOINVERSE CHANNEL MATRIX 802

PRODUCING A SECOND SINGLE-ENDED EQUALIZED MEASUREMENT SIGNAL AT LEAST PARTIALLY BASED ON THE SECOND SINGLE-ENDED MEASUREMENT SIGNAL AND A SECOND PREDETERMINED PSEUDOINVERSE CHANNEL MATRIX 804

PRODUCING A DIFFERENTIAL MEASUREMENT SIGNAL AT LEAST PARTIALLY BASED ON THE FIRST SINGLE-ENDED EQUALIZED MEASUREMENT SIGNAL AND THE SECOND SINGLE-ENDED EQUALIZED MEASUREMENT SIGNAL 806

FIG. 8

900

WHEREIN PRODUCING THE FIRST SINGLE-ENDED EQUALIZED MEASUREMENT SIGNAL COMPRISES MULTIPLYING THE FIRST SINGLE-ENDED MEASUREMENT SIGNAL WITH THE FIRST PREDETERMINED PSEUDOINVERSE CHANNEL MATRIX 902

WHEREIN PRODUCING THE SECOND SINGLE-ENDED EQUALIZED MEASUREMENT SIGNAL COMPRISES MULTIPLYING THE SECOND SINGLE-ENDED MEASUREMENT SIGNAL WITH THE SECOND PREDETERMINED PSEUDOINVERSE CHANNEL MATRIX 904

FIG. 9

PSEUDOINVERSE-BASED NOISE EQUALIZATION

CROSS-REFERENCE TO RELATED APPLICATION

This application claims the benefit under 35 U.S.C. § 119(e) of the priority date of U.S. Provisional Patent Application Ser. No. 63/381,718 filed Oct. 31, 2022, for "EQUALIZED RECONSTRUCTION," the contents and disclosure of which is incorporated herein in its entirety by this reference.

FIELD

One or more examples relate to differential signaling and differential measurement systems. One or more examples relate to noise equalization and noise equalization in differential measurement systems and in mutual capacitance measurement systems.

BACKGROUND

Differential signaling is utilized in a variety of operational context.

BRIEF DESCRIPTION OF THE DRAWINGS

To easily identify the discussion of any particular element or act, the most significant digit or digits in a reference number refer to the figure number in which that element is first introduced.

FIG. 7 illustrates an example process to produce an equalized measurement signal at least partially based on a first single-ended measurement signal and a second single-ended measurement signal, in accordance with one or more examples.

FIG. 8 illustrates an example process to produce an equalized measurement signal at least partially based on a first single-ended measurement signal and a second single-ended measurement signal, in accordance with one or more examples.

FIG. 9 illustrates an example process to equalize single-ended measurement signals utilizing pseudoinverse-based noise equalization, in accordance with one or more examples.

DETAILED DESCRIPTION

Figure 1:
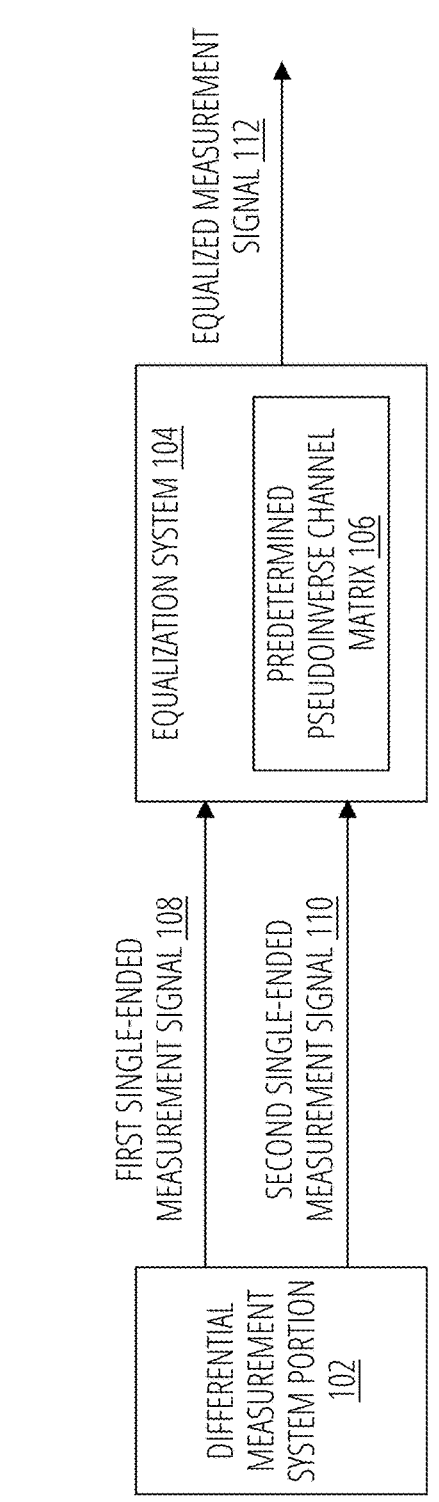
FIG. 1 is a block diagram depicting an apparatus to equalize a measurement signal produced by a differential measurement system utilizing pseudoinverse-based equalization, in accordance with one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," "on," "underlying," "upper," "lower," without limitation, is used for clarity and convenience in understanding the disclosure and accompanying drawings and does not connote or depend on any specific preference, orientation, or order, except where the context clearly indicates otherwise.

In this description the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

As used herein, the terms "assert," "de-assert" and derivatives thereof used in reference to a pin, means, respectively, to assert or de-assert a signal associated with the pin (e.g., a signal specifically assigned to the pin or a signal to which the pin is specifically assigned, without limitation).

Differential Signal Background

A differential signal represents information utilizing a difference between a pair of signals carried on respective, different physical conductors (e.g., electrical conductors, without limitation). Such signals utilized to represent a differential signal are referred to as a "differential pair."

Differential signals, and differential signaling, is in contrast to single-ended signals, and single-ended signaling. In single-ended signaling, a single signal (the "single-ended signal"), typically referenced to ground, at least partially represents information utilizing an amplitude of the signal (relative to ground). A single conductor may carry a single-ended signal.

Differential signals are sometimes referred to as "balanced" signals because, by design of a differential signaling system, any noise that affects one of the signals of the differential pair should be substantially (e.g., mostly, without limitation) mirrored on the other signal of the differential pair. A single-ended signal is sometimes referred to as an "unbalanced signal" because any noise that affects the signal is not necessarily mirrored on the ground.

A differential signaling system may offer various benefits, including noise rejection. Noise that is equally induced on to both of the lines carrying a differential pair (also called "common-mode noise"), may be rejected (e.g., cancelled, without limitation) since the information is represented by the difference between the two signals of the differential pair, and not in the absolute value of either signal on its own.

Differential-mode noise is noise that unequally affects the lines carrying a differential pair. Differential-mode noise may have the same or different source as the common-mode noise. Differential-mode noise can affect the difference between the two signals, and thus, can disrupt how information is represented by a differential pair, and generally affect information carried by a differential signaling system.

Mode conversion is the process of generating a differential signal at least partially based on a single-ended signal. Mode conversion may involve converting differential-mode noise to common-mode noise or suppressing differential-mode noise while enhancing or preserving common-mode noise. It may appear that a differential pair produced via mode conversion are substantially (e.g., mostly, without limitation) balanced signals.

A non-limiting example source of differential-mode noise in a differential pair is channel effects. Channel effects are any disturbances, distortions, or alterations that a signal undergoes when it traverses a communication channel. A channel may be a physical medium like a wire, cable, twisted-pair, electrical circuit, a wireless medium, or combinations thereof. Non-limiting examples of channel effects include attenuation, dispersion, reflections (due to impedance mismatches), or crosstalk. If the two lines of a differential pair have different physical characteristics or lengths, they may attenuate noise differently, creating an imbalance and differential-mode noise. If a line of a differential pair picks up interference from a neighboring channel, and another line of the differential pair does not—or does so differently—that may cause differential-mode noise. If there are impedance mismatches in a channel, it can cause reflections. If such reflections affect the lines of the differential pair unequally, it may cause differential-mode noise.

Additionally or alternatively, channel effects may be caused by physical asymmetries between the physical mediums (e.g., conductors, without limitation) that carry a differential pair. Any physical asymmetry, such as different line lengths, widths, or distances to noise sources, may introduce channel effects, including without limitation differential-mode noise, if, as a non-limiting example, one line picks up more (or different) noise than the other line.

Equalization is the process of reducing channel effects, including differential-mode noise, if any, in a signal received via a channel. In a differential signaling system, equalization may be performed on one or both of the signals of the differential pair to reduce channel effects. An example of an approach for equalization is to model a channel (and more specifically, the channel effects of the channel) as a matrix of values, functions, or both (a "channel matrix"), and use an inverse of the channel matrix (an "inverse channel matrix") to determine a noise equalizer for reducing channel effects present in a signal. When the signal is represented as a matrix, matrix-multiplying the signal matrix by the inverse channel matrix counteracts (e.g., reduces, without limitation) channel effects described in the channel matrix and represented in the signal matrix.

It may not be practical or even possible to exactly invert a channel matrix. Alternatively, a "best fit" inverse channel matrix called a "pseudoinverse channel matrix" or just "the pseudoinverse" may be used. The pseudoinverse channel matrix (sometimes denoted with a superscript "+") may be used to determine a noise equalizer that, as a non-limiting example, reduces a mean squared error between an equalized signal (the output of the noise equalizer) and a target differential signal.

Differential Measurement Systems Background

In a differential measurement system, measurement information (the target signal) is represented by a difference between a pair of signals—a "differential measurement pair." At least a portion of a differential measurement system may be intended to be a differential signaling system. As a non-limiting example, in a mutual capacitance measurement system, the determined capacitance is between one or more pairs of adjacent electrodes. The respective lines (e.g., electrical conductors, without limitation) of the adjacent electrodes carry signals produced in response to a predetermined mutual capacitance measurement process. Such carried signals on lines of adjacent electrodes are a differential pair. Lines of adjacent electrodes may, individually or together, be considered a channel to carry a differential signal.

Channels that carry the respective signals of a differential measurement pair may be subject to channel effects. As non-limiting examples, the conductors that carry respective signals of a differential measurement pair may have physical asymmetries. Such physical asymmetries may be for convenience (e.g., to physically fit based on specific operating conditions, without limitation) or unintentional. In one non-limiting example of such physical asymmetries, the number of nodes per line may vary across a touch sensor. The measurement information in a measurement signal, or a target signal included therein, may be reduced by such channel effects.

One or more examples relate, generally, to equalizing measurement signals utilizing pseudoinverse-based noise equalizers.

In one or more examples, the measurement signal may be a differential measurement signal. In one or more examples, the measurement signal may be a differentially derived single-ended signal; in other words, a single-ended measurement signal derived from (e.g., at least partially based on, without limitation) a differential measurement signal or otherwise including differential measurement information that could be represented by a differential measurement signal. Common noise removal/cancellation may not be realized if noise is imbalanced (unequal), stated another way, e.g., if differential-mode noise is present in one or both of the respective signals utilized to form a differential measurement signal. It should be appreciated that, in one or more examples, differential measurement information may be actual or implicit, that is, a single-ended measurement signal may include actual or implicit differential measurement information.

In one or more examples, a measurement signal may be produced in response to a measurement process (e.g., a mutual capacitance measurement process, without limitation) at least partially controlled by a measurement circuit.

In one or more examples, a single-ended measurement input signal may be produced by summing a first single-ended measurement signal and an inverted version of a second single-ended measurement signal. In one or more examples, a single-ended measurement input signal may be produced by subtracting a second measurement signal from a first measurement signal.

One or more examples relate, generally, to producing a pseudoinverse channel matrix for one or more channels of a differential measurement system. In one or more examples, to produce a pseudoinverse channel matrix, noise on respective lines of the differential measurement pair may be monitored and characterized in a channel matrix.

In one or more examples, a pseudoinverse matrix calculation may be performed to obtain a pseudoinverse channel matrix, as non-limiting examples, symbolically, utilizing numerical procedures, or a combination thereof, without limitation. By way of a non-limiting example of pseudoinverse matrix calculation, a pseudoinverse may be calculated using Singular Value Decomposition (SVD) of a channel matrix. An SVD based calculation may be computer-aided utilizing predetermined system characteristics (e.g., predetermined touch sensor characteristics, without limitation). The pseudoinverse is "doing the job" in the background but the actual operation of the device is not calculating the pseudoinverse from one moment to another.

In one or more examples, noise monitoring and characterization may be performed for a single noise source or multiple noise source, individually or as a group. In one or more examples, a channel for which a channel matrix is produced may include a line of a differential measurement pair or both lines of a differential measurement pair. In the case of multiple noise sources, a channel matrix may be produced for respective ones of the noise source per channel, a noise profile may be produced for a combination or sub-combination of noise sources per channel, or a channel matrix may be produced per channel based on a totality of modeled noise sources, without limitation.

In one or more examples, a pseudoinverse channel matrix or pseudoinverse channel matrices may be produced at least partially based on a channel matrix or channel matrices produced as discussed above. Respective pseudoinverse channel matrix may be stored in a memory, a look-up-table (LUT), or both, without limitation.

One or more examples relate, generally, to producing a noise equalizer, or a mode converter, at least partially based on one or more pseudoinverse channel matrixes produced as discussed above, e.g., a pseudoinverse-based noise equalizer or pseudoinverse-based mode converter, without limitation. One or more examples relate, generally, to a differential measurement system or portion thereof that includes a pseudoinverse-based noise equalizer, or pseudoinverse-based mode converter, to produce a differential measurement signal and, optionally, utilizes the differential measurement signal to determine target signals, target conditions, or both.

FIG. 1 is a block diagram depicting an apparatus 100 to equalize a measurement signal produced by a differential measurement system utilizing pseudoinverse-based equalization, in accordance with one or more examples.

Apparatus 100 includes a differential measurement system portion 102 and an equalization system 104. Equalization system 104 includes a predetermined pseudoinverse channel matrix 106.

Apparatus 100 may perform pseudoinverse-based equalization on a first single-ended measurement signal 108, a second single-ended measurement signal 110, or signals based thereon, as discussed herein, to produce an equalized measurement signal 112. First single-ended measurement signal 108 and second single-ended measurement signal 110 are produced by differential measurement system portion 102.

Differential measurement system portion 102 is at least a portion of a differential measurement system that represents measurement information via a difference between a pair of signals, the differential measurement pair, here first single-ended measurement signal 108 and second single-ended measurement signal 110.

First single-ended measurement signal 108 and second single-ended measurement signal 110 are carried by respective conductors (conductors not depicted) at differential measurement system portion 102 and are intended to be a differential pair but are not necessarily, perhaps likely, unbalanced.

In one or more examples, a differential measurement system that includes differential measurement system portion 102 may include, in addition to differential measurement system portion 102, one or more differential measurement system portions that produce respective pairs of single-ended measurement signals where measurement information is represented by respective difference between the single-ended measurement signals.

Equalization system 104 receives first single-ended measurement signal 108 and second single-ended measurement signal 110 and produces equalized measurement signal 112 at least partially responsive thereto. Equalization system 104 determines equalized measurement signal 112 at least partially based on first single-ended measurement signal 108, second single-ended measurement signal 110, and predetermined pseudoinverse channel matrix 106.

Predetermined pseudoinverse channel matrix 106 may be, be at least partially based on, or include one or more pseudoinverse channel matrices for reducing channel effects present in first single-ended measurement signal 108, second single-ended measurement signal 110, or a single-ended measurement signal based on a difference between first single-ended measurement signal 108 and second single-ended measurement signal 110, as discussed below. In one or more examples, predetermined pseudoinverse channel matrix 106 may indicate a pseudoinverse matrix that may be factored into a sum or product of different matrix components.

Such channel effects may be present in differential measurement system portion 102, or respective lines of differential measurement system portion 102 that carry first single-ended measurement signal 108 and second single-ended measurement signal 110. In one or more examples, reducing channel effects may include reducing differential-mode noise.

In one or more examples the predetermined pseudoinverse channel matrix 106 may include one or more coefficients. The coefficients may represent a determined degree of noise coupling to one or more channels of the differential measurement system portion 102. In one or more examples, the degree of noise coupling may be determined at least partially based on a determined amount of nonuniform spatial distribution of noise intensity or noise characteristics.

In one or more examples, equalization system 104 may produce an equalized measurement signal 112 that is, or includes, a single equalized single-ended measurement signal, multiple equalized signal-ended measurement signals, or a differential measurement signal, as discussed below. Channel effects present in equalized measurement signal 112 may be reduced or lower relative to first single-ended measurement signal 108 or second single-ended measurement signal 110. Differential-mode noise present in equalized measurement signal 112 may be reduced or lower relative to first single-ended measurement signal 108 or second single-ended measurement signal 110.

Figure 2:
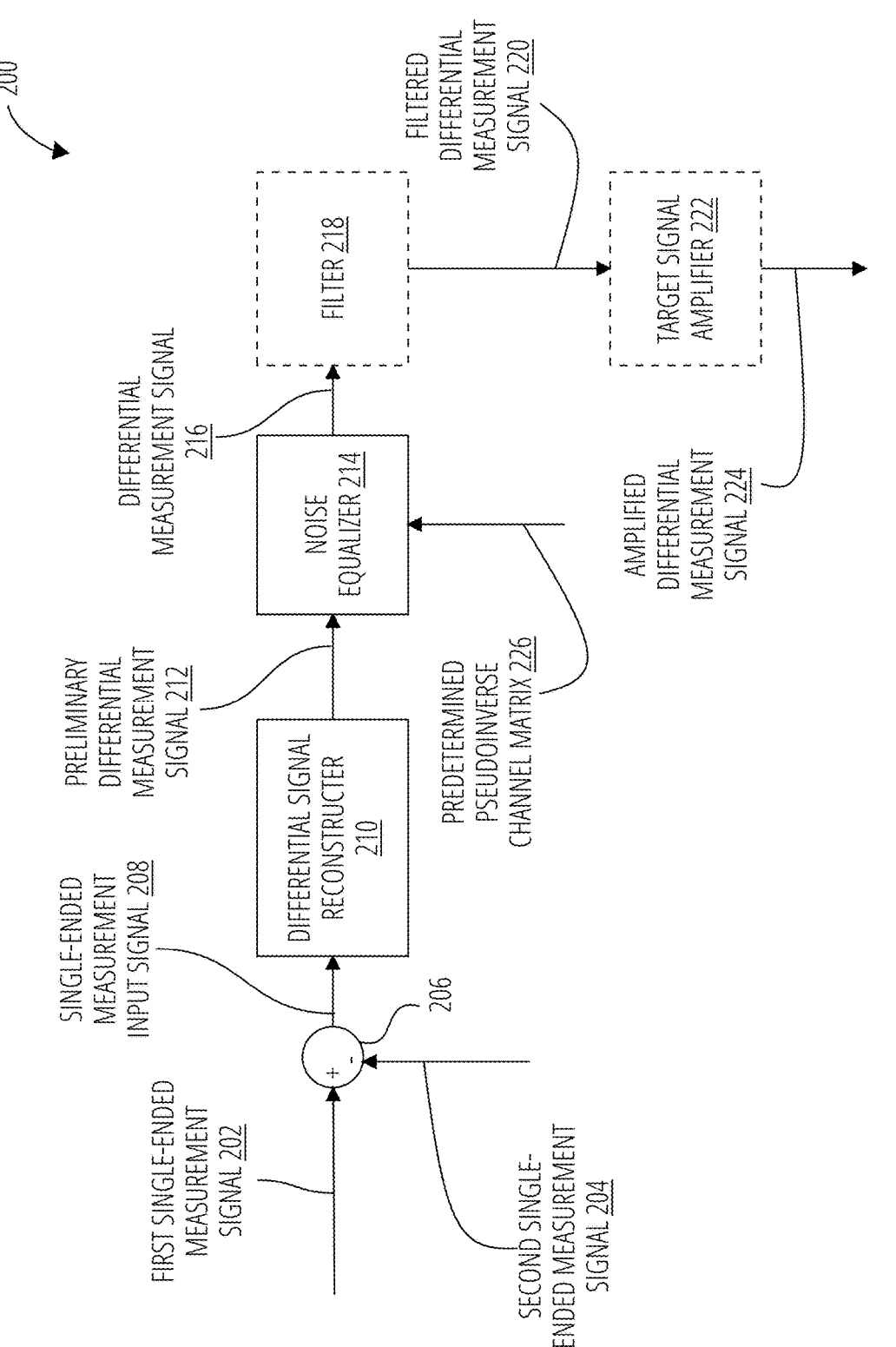
FIG. 2 is a block diagram of an apparatus for equalization of measurement signals produced by a differential measurement system, in accordance with one or more examples.

FIG. 2 is a block diagram of an apparatus 200 for equalization of measurement signals produced by a differential measurement system, in accordance with one or more examples. Apparatus 200 is a non-limiting example of an equalization system 104 and may also be referred to herein as an "equalization system 200."

In the non-limiting example depicted by FIG. 2, equalization system 200 produces a single-ended measurement signal based on respective single-ended measurement signals produced by a differential measurement system, and mode converts the single-ended measurement signal to a differential measurement signal that includes the differential information present in a difference between the single-ended measurement signals produced by a differential measurement system.

Equalization system 200 includes subtractor 206, differential signal reconstructor 210, noise equalizer 214, optional filter 218 and optional target signal amplifier 222.

Subtractor 206 receives first single-ended measurement signal 202 and second single-ended measurement signal 204 (e.g., from a differential measurement system or portion thereof, without limitation) and combines first single-ended measurement signal 202 and second single-ended measurement signal 204 to produce single-ended measurement input signal 208 as discussed below. Subtractor 206 receives first single-ended measurement signal 202 at a non-inverting input (+) and second single-ended measurement signal 204 at an inverting input (−), and sums first single-ended measurement signal 202 and inverted second single-ended measurement signal 204 to produce single-ended measurement input signal 208. In this manner, single-ended measurement input signal 208 is at least partially based on a difference between first single-ended measurement signal 202 and second single-ended measurement signal 204 and includes, at least implicitly, measurement information present in the difference between first single-ended measurement signal 202 and second single-ended measurement signal 204.

First single-ended measurement signal 202 and second single-ended measurement signal 204 are single-ended, so in addition to measurement information, they may include one or more of common-mode noise and differential-mode noise, the latter optionally due to channel effects. Thus, single-ended measurement input signal 208 may include differential measurement information, and some combination of respective differential-mode noise present in first single-ended measurement signal 202 or second single-ended measurement signal 204. Any common-mode noise present in first single-ended measurement signal 202 or second single-ended measurement signal 204 should be cancelled when the signals are combined by subtractor 206.

Differential signal reconstructor 210 receives single-ended measurement input signal 208 and produces preliminary differential measurement signal 212 at least partially responsive to single-ended measurement input signal 208. In one or more examples, differential signal reconstructor 210 may be operable to perform a reconstruction process such as a zero average technique that assumes a differential signal should have a zero average value over time and seeks to find a solution based on a pseudoinverse matrix that has a substantially zero average (or average below a predetermined threshold).

In one or more examples, differential signal reconstructor 210 determines preliminary differential measurement signal 212 at least partially based on single-ended measurement input signal 208 utilizing any suitable technique, including estimation. As a non-limiting example, differential signal reconstructor 210 may include an analog-to-digital converter (ADC) that receives an analog version of single-ended measurement input signal 208 and converts it to a digital version. Differential signal reconstructor 210 may further include a logic circuit to infer the content of an output of an ADC that processes a differential analog signal to produce a differential digital signal.

In one or more examples, producing preliminary differential measurement signal 212 is an intermediate act in producing a differential measurement pair, and while the signals of preliminary differential measurement signal 212 are meant for differential purposes, they are not yet balanced and so do not form a differential measurement pair.

Noise equalizer 214 receives preliminary differential measurement signal 212 and produces differential measurement signal 216 at least partially responsive thereto. Specifically, noise equalizer 214 determines differential measurement signal 216 at least partially based on preliminary differential measurement signal 212 and predetermined pseudoinverse channel matrix 226. Predetermined pseudoinverse channel matrix 226 is a non-limiting example of predetermined pseudoinverse channel matrix 106 of FIG. 1.

In one or more examples, preliminary differential measurement signal 212 may be represented via a matrix and predetermined pseudoinverse channel matrixes 226 may include predetermined noise coupling coefficients. Noise equalizer 214 may matrix-multiply the matrix of preliminary differential measurement signal 212 with the predetermined pseudoinverse channel matrix 226 to produce a matrix representative of differential measurement signal 216. The values of the predetermined noise coupling coefficients of predetermined pseudoinverse channel matrix 226 may be preset at least partially based on a predetermined amount. Such predetermined amounts may represent amounts by which values of a matrix of preliminary differential measurement signal 212 are to be increased or decreased to reduce channel effects including differential-mode noise.

Some channel affects may be caused by permanent or temporary physical asymmetries. As a non-limiting example, a reliably predictable mechanical deformation may occur during operation of the measurement system. Such channel affects are referred to herein as "artifacts." In one or more examples, one or more gradients may be pre-determined which represent channel affects, physical asymmetries, or both. In one or more examples, a respective gradient may be applied to a differential measurement signal and reduce artifacts that may be present.

Equalization system 200 may include optional filter 218 to reduce or remove artifacts. Filter 218 receives differential measurement signal 216 and processes (e.g., applies one or more gradients discussed above, without limitation) differential measurement signal 216 to remove artifacts and produce filtered differential measurement signal 220. Filter 218 is optional and its inclusion in equalization system 200 may depend, as a non-limiting example, on specific operating conditions. Additionally or alternatively to filter 218, equalization system 200 may include a common mode noise filter on an output of noise equalizer 214 to reduce common-mode noise that may be present in differential measurement signal 216.

Artifact filtering or common mode filtering, may (e.g., at least partially based on the filtering technique utilized, without limitation) reduce or suppress a target signal in a differential measurement signal. Thus, in one or more examples, equalization system 200 may include optional target signal amplifier 222 to amplify, to an operational level, a target signal in filtered differential measurement signal 220. Target signal amplifier 222 may receive filtered differential measurement signal 220, amplify the measurement information in filtered differential measurement signal 220 and produce amplified differential measurement signal 224, which includes the amplified measurement information. In one or more examples, the amount by which target signal amplifier 222 amplifies the target signal may be at least partially based on the coefficients of the predetermined pseudoinverse channel matrix 226. More specifically, the amount of filtering by filter 218 may be proportional to the difference in degree of noise coupling between channels. When coefficients of predetermined pseudoinverse channel matrix 226 are set at least partially based on a difference in degree of noise coupling they may be proportional to the amount of filtering applied by filter 218 and, therefore, an amount by which the target signal has been reduced may be determined at least partially based on the coefficients of predetermined pseudoinverse channel matrix 226 and utilized to calculate an amplification amount.

Notably, in one or more examples, differential signal reconstructor 210 and noise equalizer 214 may form some or a totality of a mode converter that produces a differential signal from a single-ended signal.

Amplified differential measurement signal 224 may be utilized as equalized measurement signal 112 of FIG. 1.

In one or more examples, respective pseudoinverse channel matrices may be produced for respective lines of a differential measurement system that produced the single-ended measurement signals, the difference between which respective lines include the target measurement information. This is different than the case where a pseudoinverse channel matrix is produced for a single-ended measurement signal that includes differential measurement information (e.g., single-ended measurement input signal 208 of FIG. 2).

Figure 3:
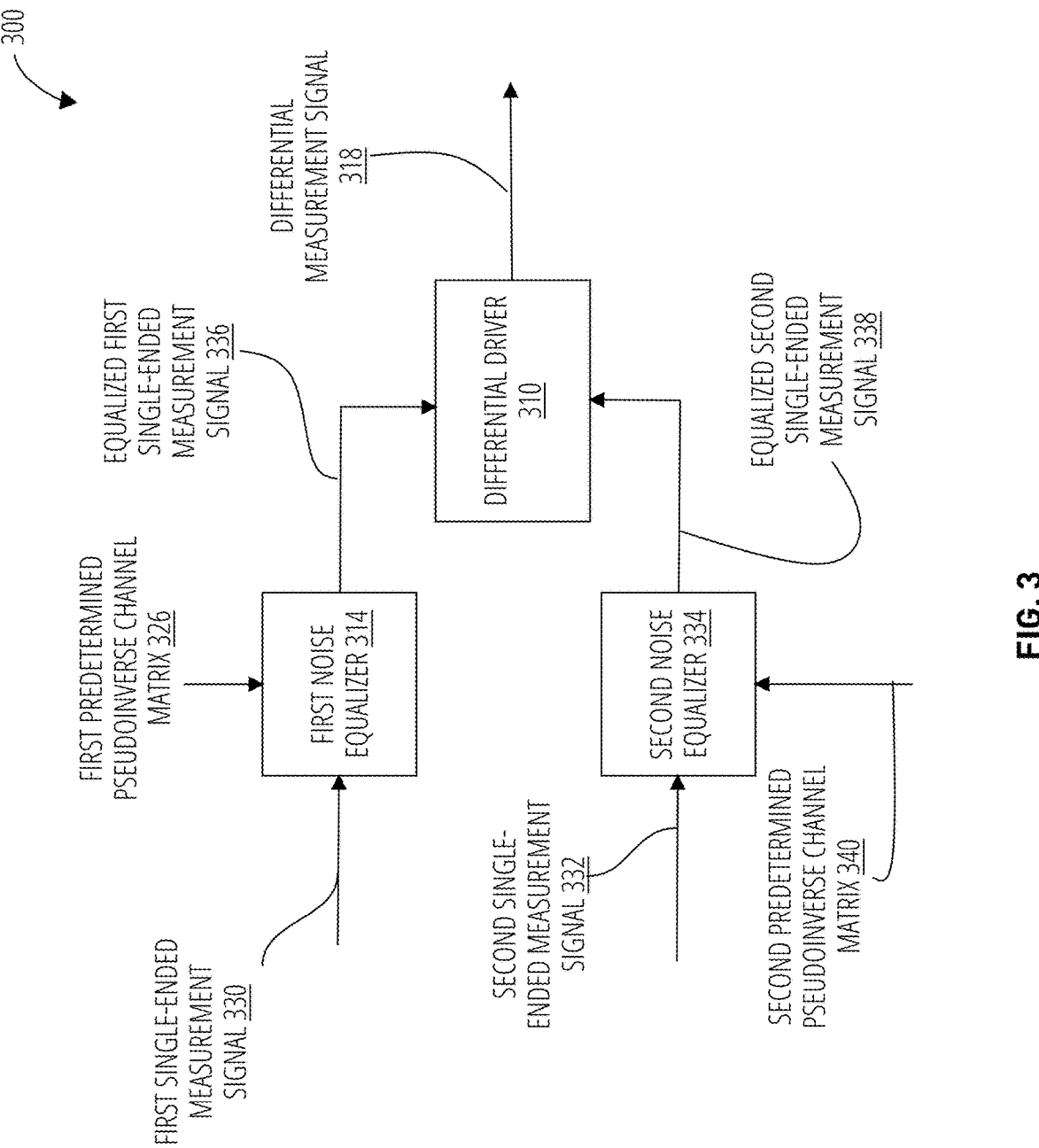
FIG. 3 is a block diagram of an apparatus for equalization of measurement signals produced by a differential measurement system, in accordance with one or more examples.

FIG. 3 is a block diagram of an apparatus 300 for equalization of measurement signals produced by a differential measurement system, in accordance with one or more examples. Apparatus 300 is a non-limiting example of an equalization system 104 and may also be referred to herein as an "equalization system 300."

Equalization system 300 includes first noise equalizer 314, second noise equalizer 334 and differential driver 310.

Equalization system 300 applies respective equalizations to single-ended measurement signals produced by a differential measurement system and produces a differential measurement signal at least partially based on the equalized measurement signals. Respective equalizations applied to respective ones of the single-ended measurement signals are at least partially based on respective predetermined pseudoinverse channel matrices.

First noise equalizer 314 receives first single-ended measurement signal 330 and produces equalized first single-ended measurement signal 336 at least partially responsive thereto. First noise equalizer 314 determines equalized first single-ended measurement signal 336 at least partially based on first single-ended measurement signal 330 and first predetermined pseudoinverse channel matrix 326. Second noise equalizer 334 receives second single-ended measurement signal 332 and produces equalized second single-ended measurement signal 338 at least partially responsive thereto. Second noise equalizer 334 determines equalized second single-ended measurement signal 338 at least partially based on second single-ended measurement signal 332 and second predetermined pseudoinverse channel matrix 340.

In one or more examples, respective values of first predetermined pseudoinverse channel matrix 326 and second predetermined pseudoinverse channel matrix 340 are determined as discussed above to reduce channel effects including differential-mode noise that may be present in first single-ended measurement signal 330 or second single-ended measurement signal 332.

Differential driver 310 produces a differential signal (differential measurement signal 318) based on a pair of input signals (here equalized first single-ended measurement signal 336 and equalized second single-ended measurement signal 338).

Figure 4:
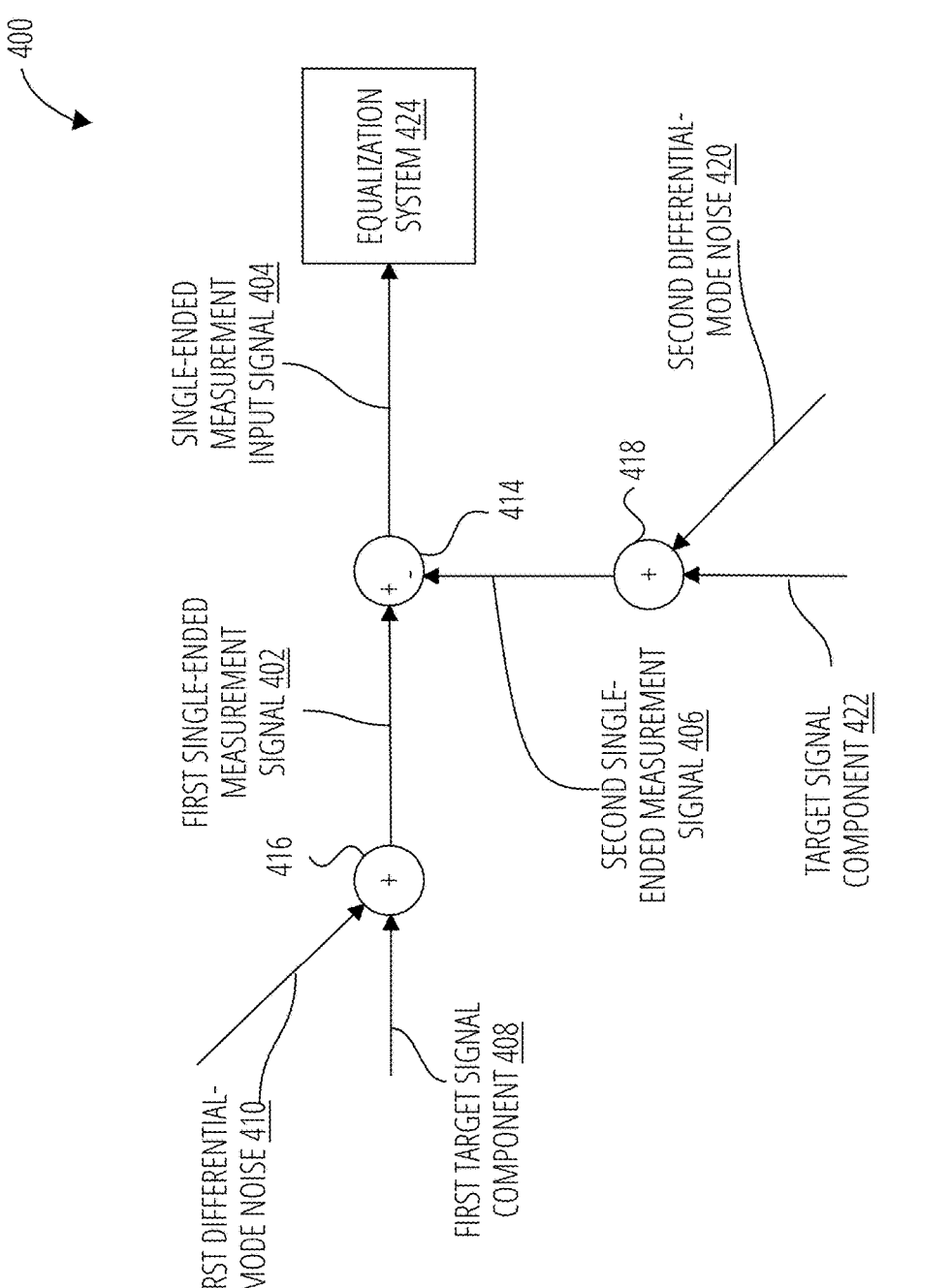
FIG. 4 is a block diagram depicting a system representative of a portion of a differential measurement system that provides first and second single-ended measurement signals for pseudoinverse-based noise equalization, in accordance with one or more examples.

FIG. 4 is a block diagram depicting a system 400 representative of a portion of a differential measurement system that provides first and second single-ended measurement signals for pseudoinverse-based noise equalization, in accordance with one or more examples.

System 400 includes summer 416, subtractor 414, summer 418 and equalization system 424. Summer 416, subtractor 414, and summer 418 may form at least a portion of a differential measurement system such as differential measurement system portion 102 of FIG. 1. Alternatively, subtractor 414 may be a part of equalization system 424.

First differential-mode noise 410 is combined with first target signal component 408 at summer 416, and second differential-mode noise 420 is combined with target signal component 422 at summer 418.

In one or more examples, summer 416 and summer 418 may combine first differential-mode noise 410 and second differential-mode noise 420 with first target signal component 408 and target signal component 422, respectively, (or represent portions where such signals are combined) to a different degree due to respective channel affects that cause uneven capacitive coupling. In other words, first differential-mode noise 410 and second differential-mode noise 420 may represent noise that is substantially equal but affects first target signal component 408 and target signal component 422 differently due to channel effects.

In one or more examples, first differential-mode noise 410 and second differential-mode noise 420 may represent noise that is different due, as a non-limiting example, to spatial variation. In this case, summer 416 and summer 418 may combine first differential-mode noise 410 and second differential-mode noise 420 with first target signal component 408 and target signal component 422, respectively, responsive to a similar degree of capacitive coupling, but first single-ended measurement signal 402 and second single-ended measurement signal 406 nevertheless still include different amounts of differential-mode noise.

In either case, when first single-ended measurement signal 402 and second single-ended measurement signal 406 are combined by subtractor 414 to produce single-ended measurement input signal 404, the differential-mode noise in single-ended measurement input signal 404 obscures first target signal component 408 and target signal component 422 the difference between which represents a target signal. Equalization system 424 may process single-ended measurement input signal 404 utilizing pseudoinverse-based noise equalization to produce a differential target signal.

Figure 5:
FIG. 5 illustrates an example process to equalize a measurement signal produced by a differential measurement system utilizing pseudoinverse-based equalization, in accordance with one or more examples.

FIG. 5 illustrates an example process 500 to equalize a measurement signal produced by a differential measurement system utilizing pseudoinverse-based equalization, in accordance with one or more examples. Some or a totality of operations of process 500 may be performed, as a non-limiting example, by apparatus 100, equalization system 200, equalization system 300, system 400, system 1000, touch display system portion 1200, discussed below.

Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

In one or more examples, process 500 may include obtaining a first single-ended measurement signal and a second single-ended measurement signal at operation 502.

In one or more examples, process 500 may include producing an equalized measurement signal at least partially based on a predetermined pseudoinverse channel matrix and one or more of: the first single-ended measurement signal and the second single-ended measurement signal at operation 504.

Figure 6:
FIG. 6 illustrates an example process for producing a predetermined pseudoinverse channel matrix, in accordance with one or more examples.

FIG. 6 illustrates an example process 600 for producing a predetermined pseudoinverse channel matrix, in accordance with one or more examples. Some or a totality of operations of process 600 may be performed, as a non-limiting example, by apparatus 100, equalization system 200, equalization system 300, system 400, system 1000, or touch display system portion 1200.

The example process 600 depicts a particular operation it may be a sequence of operations, and the sequence may be altered without departing from the scope of the present disclosure. For example, some operations may be performed in parallel or in a different sequence that does not materially affect the function of the process 600. In other examples, different components of an example device or system that implements the process 600 may perform functions at substantially the same time or in a specific sequence.

In one or more examples, process 600 may include setting coefficients of the predetermined pseudoinverse channel matrix to reduce channel effects at operation 602.

FIG. 7 illustrates an example process 700 to produce an equalized measurement signal at least partially based on a first single-ended measurement signal and a second single-ended measurement signal, in accordance with one or more examples. Some or a totality of operations of process 700 may be performed, as a non-limiting example, by apparatus 100, equalization system 200, equalization system 300, system 400, system 1000, or touch display system portion 1200.

Although the example process 700 depicts a particular sequence of operations, the sequence may be altered without departing from the scope of the present disclosure. For example, some of the operations depicted may be performed in parallel or in a different sequence that does not materially affect the function of the process 700. In other examples, different components of an example device or system that implements the process 700 may perform functions at substantially the same time or in a specific sequence.

In one or more examples, the process 700 may include producing a single-ended measurement input signal at least partially based on a relationship between the first single-ended measurement signal and the second single-ended measurement signal at operation 702.

In one or more examples, the process 700 may include producing the equalized measurement signal at least partially based on a predetermined pseudoinverse channel matrix and the single-ended measurement input signal at operation 704.

FIG. 8 illustrates an example process 800 to produce an equalized measurement signal at least partially based on a first single-ended measurement signal and a second single-ended measurement signal, in accordance with one or more examples. Some or a totality of operations of process 800 may be performed, as a non-limiting example, by apparatus 100, equalization system 200, equalization system 300, system 400, system 1000, or touch display system portion 1200.

Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

In one or more examples, process 800 may include producing a first single-ended equalized measurement signal at least partially based on the first single-ended measurement signal and a first predetermined pseudoinverse channel matrix at operation 802.

In one or more examples, process 800 may include producing a second single-ended equalized measurement signal at least partially based on the second single-ended measurement signal and a second predetermined pseudoinverse channel matrix at operation 804.

In one or more examples, process 800 may include producing a differential measurement signal at least partially based on the first single-ended equalized measurement signal and the second single-ended equalized measurement signal at operation 806.

FIG. 9 illustrates an example process 900 to produce a differential measurement signal (or equalize single-ended measurement signals) utilizing pseudoinverse-based noise equalization, in accordance with one or more examples. Some or a totality of operations of process 900 may be performed, as a non-limiting example, by apparatus 100, equalization system 200, equalization system 300, system 400, system 1000, or touch display system portion 1200. In one or more examples, process 900 may be a non-limiting example of a process produce the differential measurement signals of operation 806 of process 800.

Although the example process 900 depicts a particular sequence of operations, the sequence may be altered without departing from the scope of the present disclosure. For example, some of the operations depicted may be performed in parallel or in a different sequence that does not materially affect the function of the process 900. In other examples, different components of an example device or system that implements the process 900 may perform functions at substantially the same time or in a specific sequence.

In one or more examples, process 900 may include, wherein producing the first single-ended equalized measurement signal comprises multiplying the first single-ended measurement signal with the first predetermined pseudoinverse channel matrix at operation 902.

In one or more examples, process 900 may include, wherein producing the second single-ended equalized measurement signal comprises multiplying the second single-ended measurement signal with the second predetermined pseudoinverse channel matrix at operation 904.

Figure 10:
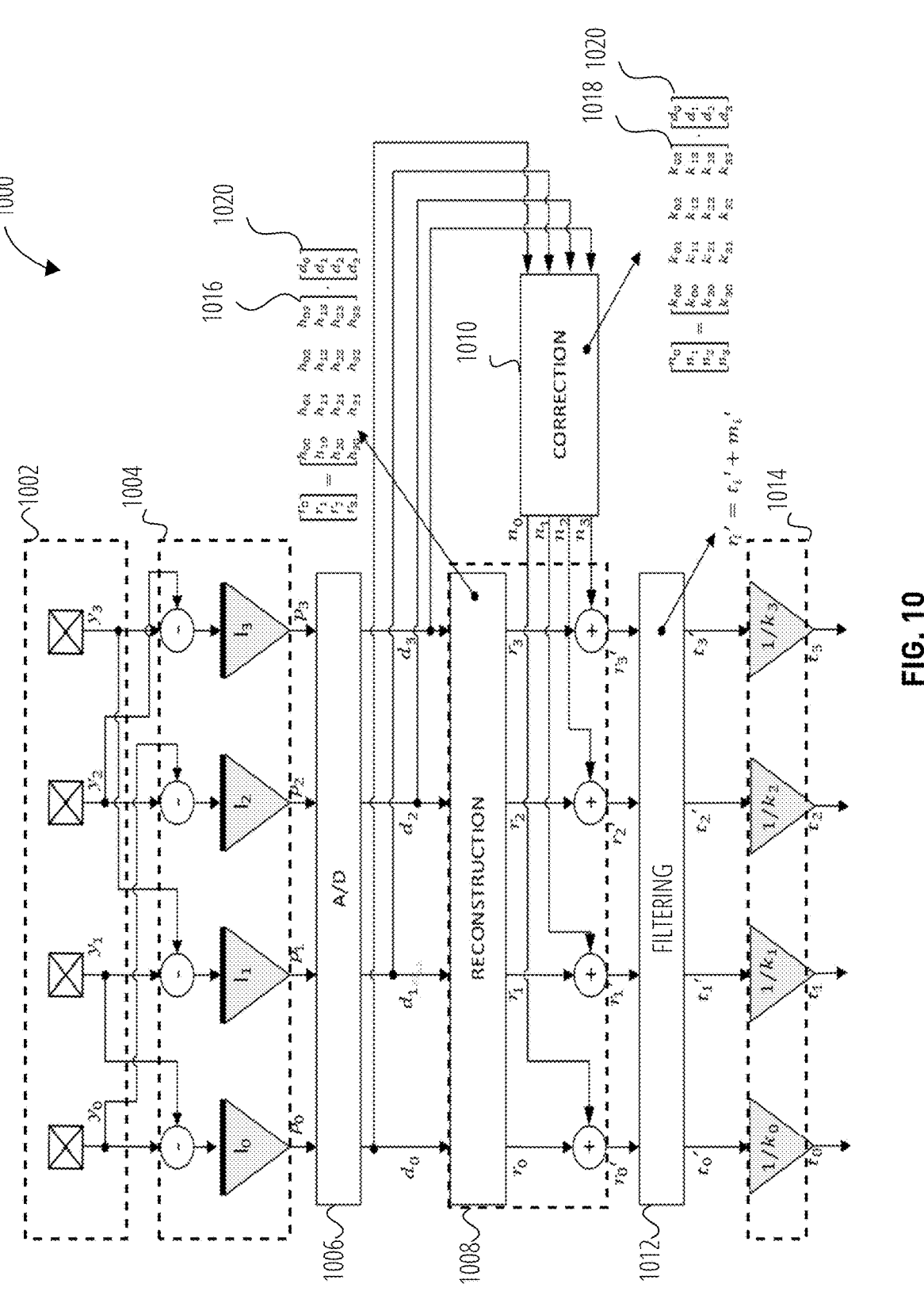
FIG. 10 is a schematic block diagram depicting a system that includes pseudoinverse-based mode conversion to produce differential measurement signals, in accordance with one or more examples.

FIG. 10 is a schematic block diagram depicting a system 1000 that includes pseudoinverse-based mode conversion to produce differential measurement signals, in accordance with one or more examples.

System 1000 includes an electrode connection block 1002, a differential amplification block 1004, an analog-to-digital converter (A/D) block 1006, a reconstruction block 1008, a correction block 1010, a filter block 1012, and a signal amplification block 1014.

The electrode connection block 1002 includes electrode connections for receiving current (electrical current) signals $Y_0$, $Y_1$, $Y_2$ and $Y_3$ produced at least partially responsive to a mutual capacitance measurement process.

The differential amplification block 1004 includes differential amplifiers respectively to receive current signals (e.g., signals $Y_0$, $Y_1$, $Y_2$ and $Y_3$, without limitation) from at least two adjacent ones of the electrode connections of the electrode connection block 1002 and amplify differences between the respective received current signals to produce analog single-ended difference signals $P_0$, $P_1$, $P_2$, and $P_3$. As used herein, the term "adjacent" when referring to electrode connections encompasses physically adjacent electrode connections (e.g., in a layout where respective electrode connections are located immediately next to each other, without limitation) and electrically adjacent electrode connections (e.g., where a target signal is at least partially based on the respective electrode connections, which may or may not be physically adjacent, without limitation).

In the specific non-limiting example depicted by FIG. 10, a first differential amplifier $I_0$ of differential amplification block 1004 is coupled to receive current $Y_0$ and current $Y_1$ and amplify a difference therebetween, a second differential amplifier $I_1$ of differential amplification block 1004 is coupled to receive current $Y_1$ and current $Y_2$ and amplify a difference therebetween, a third differential amplifier $I_2$ of differential amplification block 1004 is coupled to receive current $Y_2$ and current $Y_3$ and amplify a difference therebetween, and a fourth differential amplifier $I_3$ of differential amplification block 1004 is coupled to receive current $Y_3$ and current $Y_0$ and amplify a difference therebetween.

The A/D block 1006 receives analog single-ended difference signals $P_0$, $P_1$, $P_2$, and $P_3$ and produces, via analog-to-digital signal conversion, digital single-ended signals $d_0$, $d_1$, $d_2$, and $d_3$ at least partially based on respective ones of the received single-ended signals.

The reconstruction block 1008 receives digital single-ended difference signals $d_0$, $d_1$, $d_2$, and $d_3$ and produces uncorrected reconstructed differential signals $r_0$, $r_1$, $r_2$, and $r_3$ at least partially based thereon. In the specific non-limiting example depicted by FIG. 10, determination of uncorrected reconstructed differential signals $r_0$, $r_1$, $r_2$, and $r_3$ by reconstruction block 1008 includes a determination of respective dot products of a matrix 1020 including respective digital single-ended difference signals $d_0$, $d_1$, $d_2$, and $d_3$ and a further matrix 1016 represents a mathematical model of the reconstruction. Given a vector of differential measurement d, one can calculate the reconstructed values (r) by multiplying the measurements (d) with matrix (h).

The correction block 1010 receives respective digital single-ended difference signals $d_0$, $d_1$, $d_2$, and $d_3$ and produces respective correction signals $n_0$, $n_1$, $n_2$, and $n_3$ at least partially responsive thereto. In the specific non-limiting example depicted by FIG. 10, the correction block 1010 determines correction signals $n_0$, $n_1$, $n_2$, and $n_3$ by determining a dot product of the matrix 1020 including respective digital single-ended difference signals $d_0$, $d_1$, $d_2$, and $d_3$ and a further matrix 1018 including a pseudoinverse channel matrix (e.g., predetermined pseudoinverse channel matrix 106, predetermined pseudoinverse channel matrix 226, without limitation). The values of respective coefficients "k" of pseudoinverse channel matrix 1018 are set to reduce channel effects and may be proportional to a determined degree of noise coupling for one or more channels.

The correction signals $n_0$, $n_1$, $n_2$, and $n_3$ are applied to the output of the reconstruction block 1008, and more specifically, applied to the uncorrected reconstructed differential signals $r_0$, $r_1$, $r_2$, and $r_3$ via respective summation blocks to produce the reconstructed differential signals $r_0'$, $r_1'$, $r_2'$, and $r_3'$.

The filter block 1012 receives respective reconstructed differential signals $r_0'$, $r_1'$, $r_2'$, and $r_3'$ and produces filtered, reconstructed differential signals $t_0'$, $t_1'$, $t_2'$, and $t_3'$ at least partially responsive thereto. In one or more examples, filter block 1012 may apply common-mode noise filtering, artifact filtering, or both to respective corrected reconstructed differential signals $r_0'$, $r_1'$, $r_2'$, and $r_3'$. In one or more examples, filter block 1012 may filter a totality or a subset of reconstructed differential signals $r_0'$, $r_1'$, $r_2'$, and $r_3'$. As a non-limiting example, the subset of reconstructed differential signals may correspond to channels associated with a periphery of a touch sensor or touch display.

The signal amplification block 1014 includes respective signal amplifiers to amplify (i.e., increase or increase signal-to-noise ratio) target signals in respective filtered, reconstructed differential signals $t_0'$, $t_1'$, $t_2'$, and $t_3'$ to produce respective differential target signals $t_0$, $t_1$, $t_2$, and $t_3$.

Figure 11:
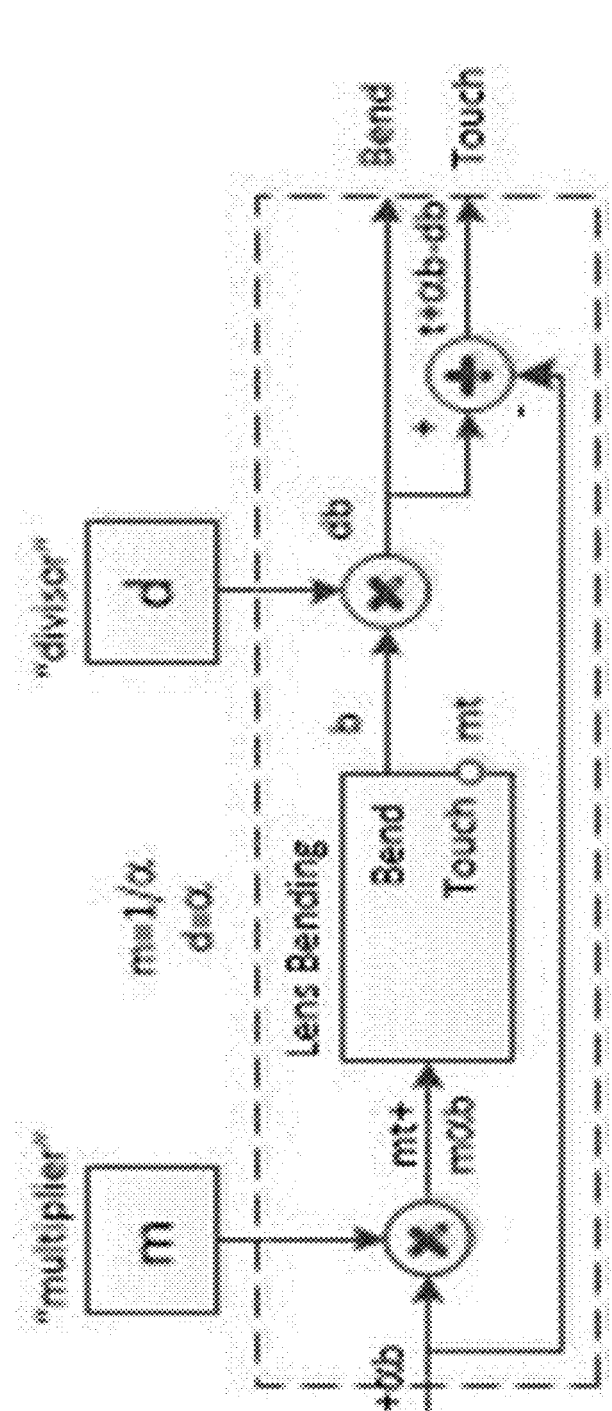
FIG. 11 is a block diagram of a lens bending filter in accordance with one or more examples.

FIG. 11 is a block diagram of a target signal amplifier 1100, in accordance with one or more examples. Target signal amplifier 1100 is a non-limiting example of a target signal amplifier 222 of FIG. 2 or a signal amplification block 1014 of FIG. 10.

The sequence "τ+ab" represents a reconstructed differential signal (e.g., $r_0'$, $r_1'$, $r_2'$, and $r_3'$ in FIG. 10, without limitation). The reconstructed differential signal τ+ab includes the combination "+" of a target signal "τ" and a moving average "α" bend noise "b" component "ab." Here, "bend noise b" represents an amount (e.g., based on an average, without limitation) by which a target signal τ may be reduced by an equalization process at reconstruction block 1008. The symbol "m" represents a multiplier and the symbol "d" represents a divisor. The relationship between multiplier m and moving average α is m=1/a. The relationship between divisor d and moving average α is d=α.

The reconstructed differential signal τ+αb is multiplied by multiplier m to produce "mτ+mαb," which is fed to an input of the Lens Bending block.

First bend b and multiplied target signal MT (target signal is labelled "touch" in FIG. 11) are separately produced at outputs of the Lens Bending block. First bend "b" is a low frequency component that may be obtained by fitting a low order polynomial (7th order) to the reconstructed differential signal τ+αb as multiplied by multiplier m.

The first bend b produced at the output of the Lens Bending block is multiplied with divisor d to produce a second bend db.

The reconstructed differential signal τ+αb is subtracted from multiplied second bend db to produce a filtered target signal τ+αb−db.

The multiplier m and divisor d may be independently specified parameters (e.g., predetermined parameters or provided by a user, without limitation) and may be in any suitable format or represented according to any suitable notation scheme for representing integer numbers, non-integer numbers, or both.

By way of a specific non-limiting example, one or more of multiplier m and divisor d may be in 8.8 format (i.e., 16-bit fixed notation). The upper 8 bits represent the integer part of the number and the lower 8 bits represent the fractional part of the number in units of 1/256.

Background for Mutual Capacitance Measurement

Mutual capacitance is capacitive coupling between objects and in the case of touch sensors, it is the capacitive coupling between intersections of electrodes serving as transmitters (transmitter electrodes, also called "X electrodes") and electrodes serving as receivers (receiver electrodes, also called "Y electrodes").

In a typical arrangement of a touch sensor, X lines and Y lines of X and Y electrodes, respectively, are arranged in a grid of rows and columns. Respective intersections of the X and Y lines each referred to herein as "sensor nodes." In a mutual capacitance measurement, the X electrodes are driven, in a predetermined manner, with voltage pulses that inject current into the Y electrodes' capacitance via mutual capacitance (CM) coupling between the X and Y electrodes. The amount of injected current is indicative of a mutual capacitance between the X and Y electrodes. When no grounded object is in suitable proximity to a sensor node, the injected current represents a baseline mutual capacitance of the Y electrode. When a grounded object is in suitable proximity to a sensor node, the grounded object shunts away some of the charge (e.g., current) via a capacitively coupled ground path, and so appears to an observer (i.e., a measurement circuit) to change (e.g., decrease, without limitation) the mutual capacitance between the X and Y electrodes intersecting at that sensor node.

An integrated circuit (IC) coupled to respective X and Y electrodes may control mutual capacitance measurement and touch sensing. A touch processor of the IC may observe changes in mutual capacitance and use the changes, as a non-limiting example, to determine that a touch event occurred at the sensor node. In a mutual capacitance measurement, a measurement signal may include a touch signal and a noise. A noise of a measurement signal may include a system noise and an environmental noise. In the case of a touch display, a source of a system noise may include a display ("a display noise source"), such as underlying hardware or electronics that drive the display, without limitation. Non-limiting examples of a display include a liquid crystal display (LCD) and hardware or electronics that drive the LCD. Thus, a noise of a measurement signal may include a display noise, and a measurement signal may include a touch signal, a display noise signal, and an environmental noise.

If X lines and Y lines of a touch sensor are laid out in a rectangular shape, the X lines typically have uniform lengths and the Y lines typically have uniform lengths. Thus, they typically exhibit a uniform degree of noise coupling, which may be cancelled.

If X lines and Y lines of a touch sensor are laid out in a non-rectangular shape (a "non-rectangular touch sensor"), then there may be physical asymmetries between respective X or Y lines that cause channel effects such as differential-mode noise. As a non-limiting example, in a non-rectangular touch sensor, one or more of the X lines or Y lines may have non-uniform lengths. As another non-limiting example, assuming uniform distance between sensor nodes, a non-rectangular touch sensor may include non-uniform numbers of nodes per X electrode, Y electrode, or both. Stated another way, in a non-rectangular touch sensor, some X electrodes may include a different number of sensor nodes than other X electrodes, or some Y electrodes may include a different number of sensor nodes than other Y electrodes.

The length of an X line or Y line and the number of sensor nodes per electrode may affect the degree of noise coupling and amount of a noise included in measurement signals. Nonuniform line length or nonuniform number of nodes can cause nonuniform noise coupling with one or more noise sources.

Additionally or alternatively to physical asymmetries, nonuniform spatial distribution (where noise coupling depends on a location of a receiver relative to a noise source) of noise intensity or characteristics (also referred to herein as "spatial variation") may cause nonuniform degree of noise coupling. Spatial variation may be caused by, as a non-limiting example, by directionality of noise emissions by a noise source (the noise source emits noise more strongly or differently in certain directions than other directions), nonuniform interference patterns, nonuniform attenuation, or nonuniform propagation patterns. Nonuniform interference patterns, attenuation, or propagation may depend, as a non-limiting example, on what obstructions are present (e.g., physically present, electrically present, without limitation) between a receiver and a noise source, material properties, or relevant frequencies.

In mutual capacitance measurement, capacitance is measured between adjacent lines, so nonuniform noise coupling may introduce differential-mode noise that affects a mutual capacitance measurement. Accordingly, a noise of a measurement signal, including without limitation a display noise, may be influenced by a shape of a touch sensor, and such shape induced influence on a measurement signal may cause an inaccurate capacitance determination or incorrect touch detection (incorrect touch detection may cause, as non-limiting examples, phantom touches, missed touches, or imprecise touch locations). As a non-limiting example, such shape induced influence on a measurement signal may reduce the signal strength (e.g., by having an unknown affect on a measurement signal, without limitation) of a determined capacitance value or a detected touch event based on the measurement signal. In the case of a rectangular or non-rectangular touch sensor, spatial variation induced influence on a measurement signal may (in addition to or alternatively to shape induced influence) reduce the signal strength of a determined capacitance value or a detected touch event.

Noise equalization may be used in mutual capacitance measurement to compensate for difference in noise coupling between adjacent lines of a touch sensor. In the context of mutual capacitance measurement, noise equalization may involve equalizing (or balancing) noise so that it does not disproportionately impact certain areas of a touch sensor or mutual capacitance measurements thereof.

One or more examples relate, generally, to pseudoinverse-based noise equalization in a mutual capacitance measurement. In one or more examples, a channel matrix upon which a pseudoinverse channel matrix of a noise equalizer is at least partially based may characterize channel effects in terms of capacitive coupling with a display noise source. Such a pseudoinverse-based noise equalizer may reduce channel effects (e.g., channel effects based on length of lines, number of nodes, spacing between nodes, or combinations of the same, without limitation). Such a pseudoinverse-based noise equalizer may reduce noise that is differential-mode noise, including without limitation display noise that is differential-mode noise.

Figure 12:
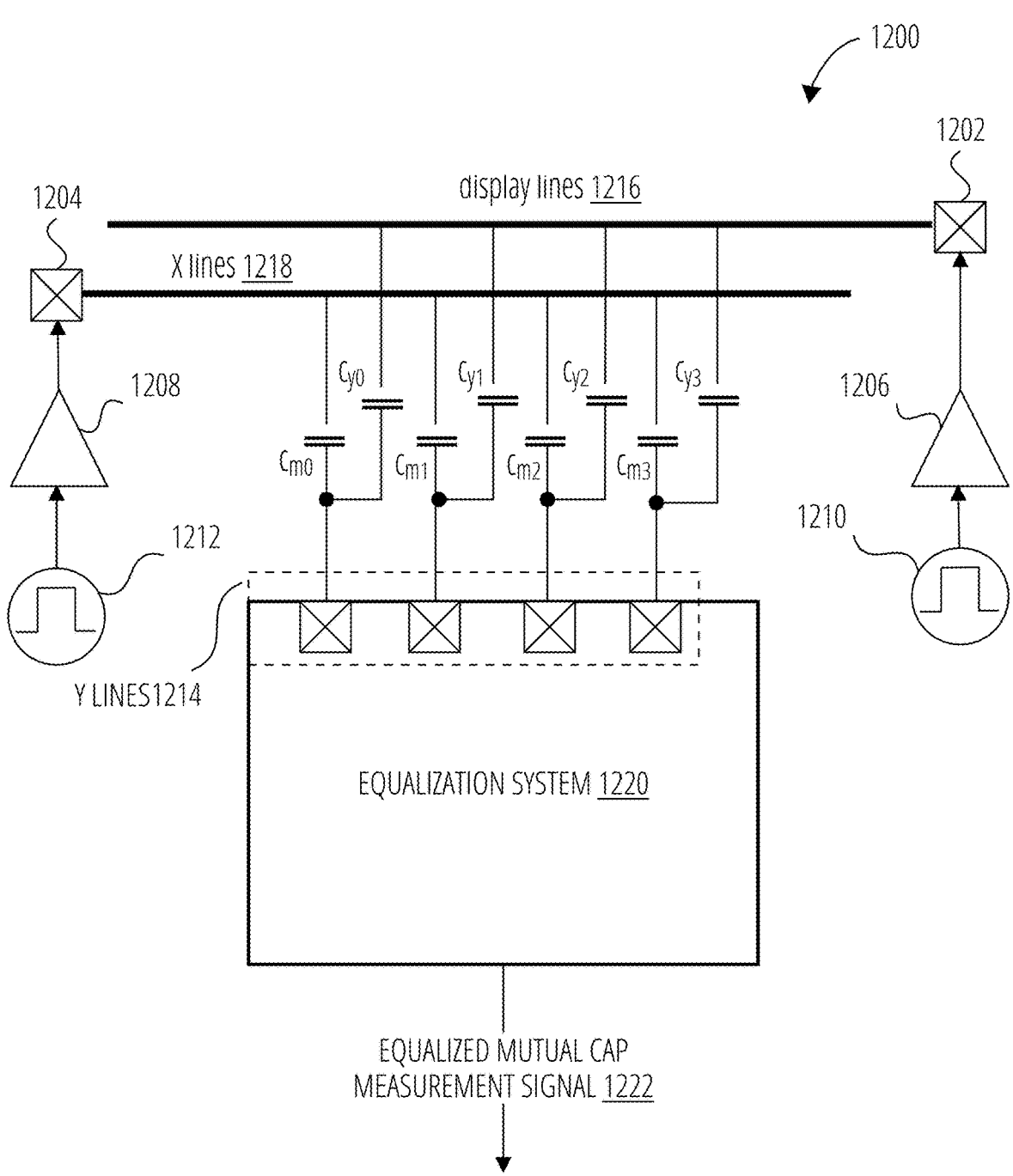
FIG. 12 is a schematic block diagram depicting a touch display system portion that utilizes pseudoinverse-based equalization of noise, in accordance with one or more examples.

FIG. 12 is a schematic block diagram depicting a touch display system portion 1200 that utilizes pseudoinverse-based equalization of noise, in accordance with one or more examples.

Touch display system portion 1200 includes connections 1202, 1204, display drivers 1206, display lines 1216, touch drivers 1208, X lines 1218, Y lines 1214 and equalization system 1220.

When touch drivers 1208 apply drive signals 1212 as driven drive signals onto one or more of X lines 1218 via respective connections 1204, touch signals associated with the driven drive signals 1212 are injected to Y lines 1214 via coupling via mutual capacitances $c_{m0}$, $c_{m1}$, $c_{m2}$ or $c_{m3}$. When display drivers 1206 applies sync signals 1210 as driven sync signals onto one or more of display lines 1216 via connections 1202, display noise corresponding to the driven sync signals 1210 is injected to respective Y lines 1214 via coupling via mutual capacitances $C_{y0}$, $C_{y1}$, $C_{y2}$ and $C_{y3}$.

Equalization system 1220 equalizes the mutual capacitance measurement signals received via Y lines 1214 to produce equalized mutual capacitance measurement signal 1222, as non-limiting examples, in the manner discussed with respect to apparatus 100, equalization system 200, equalization system 300, or system 1000.

In one or more examples, touch display system portion 1200 may apply pseudoinverse-based noise equalization discussed herein to mutual cap measurement signals received from a totality of Y lines 1214, or apply pseudo-inverse-based noise equalization solely to a subset of Y lines 1214, as a non-limiting examples, respective ones of Y lines 1214 that have a different number of nodes or line length than a predetermined baseline node number or line length.

FIG. 13, FIG. 14, FIG. 15, and FIG. 16 are graphs depicting a delta (A) signal ("A"), a reconstruction signal ("reconstruction"), a scaling reconstruction signal ("scaling reconstruction"), and boosted touch signal ("boosted touch") in several different touch scenarios at a mutual capacitance measurement system, in accordance with one or more examples.

In this figure, "delta" signal is a mutual capacitance measurement signal. When the system wakes up, the mutual capacitance measurement signal is captured and stored (e.g., at a storage device, without limitation). This represents a capacitance across a touch sensor without any touch (which may also be referred to herein as a "baseline capacitance" and the measurement a "baseline measurement"). On a subsequent measurement, a difference with respect to the baseline measurement is made and, therefore, called Delta.

The reconstruction signal is a reconstructed, corrected differential mutual capacitance measurement signal (e.g., a reconstructed differential signals $r_0'$, $r_1'$, $r_2'$, and $r_3'$ of FIG. 10). The scaling reconstruction signal is a filtered, reconstructed differential signals (e.g., filtered, reconstructed differential signals $t_0'$, $t_1'$, $t_2'$, and $t_3'$ of FIG. 10). The boosted touch is the differential target signals (e.g., differential target signals $t_0$, $t_1$, $t_2$, and $t_3$ of FIG. 10).

Figure 13:
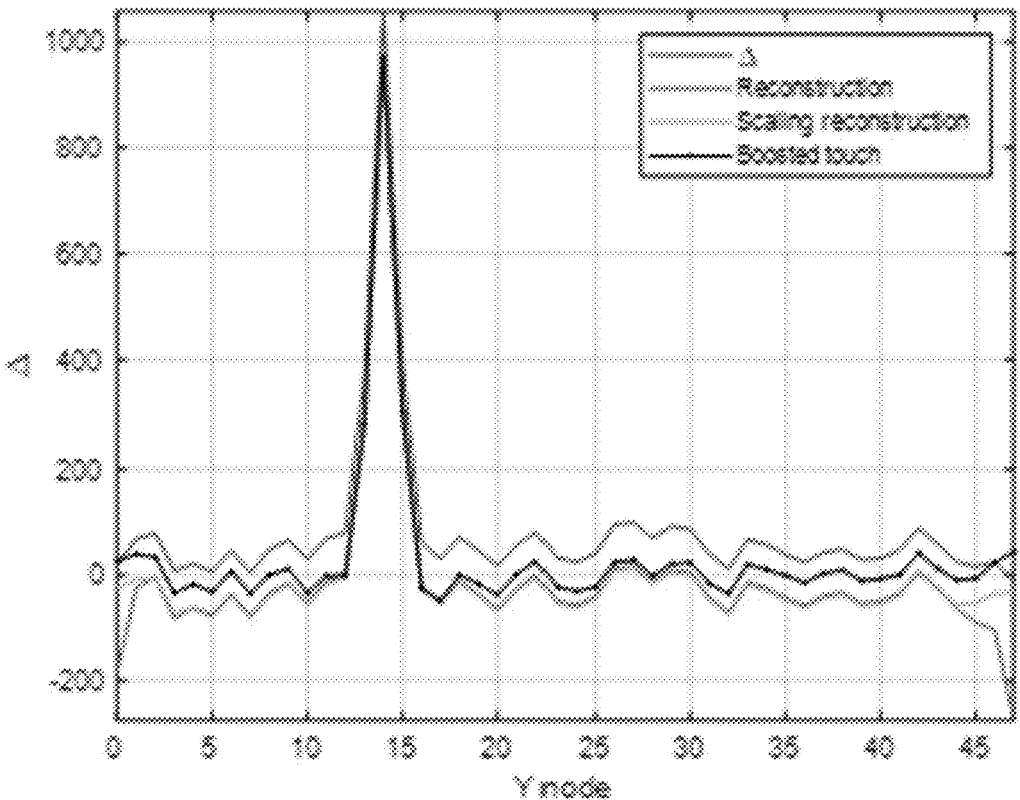
FIG. 13, FIG. 14, FIG. 15, and FIG. 16 are graphs depicting a delta (Δ) signal, reconstruction signal, scaling reconstruction signal, and boosted touch signal in several different touch scenarios at a mutual capacitance measurement system, in accordance with one or more examples.
Figure 14:
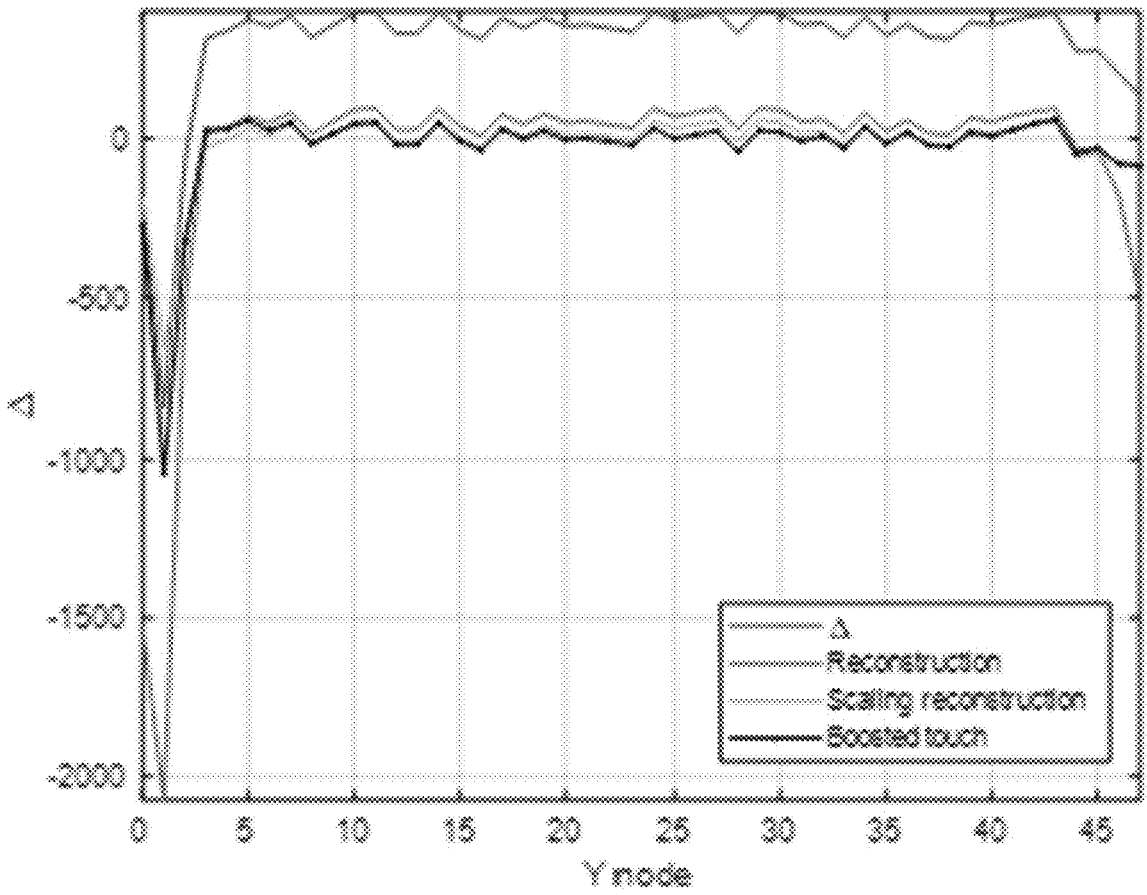
Figure 15:
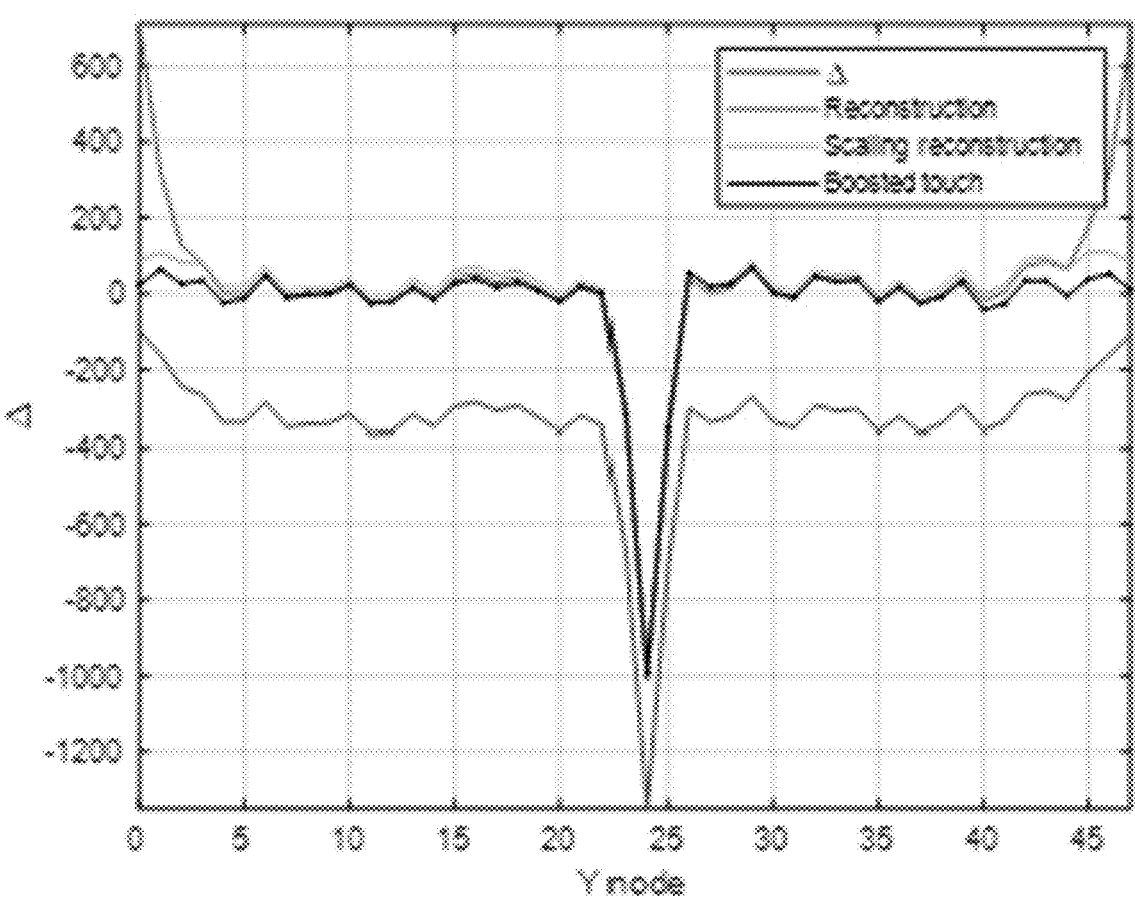
Figure 16:
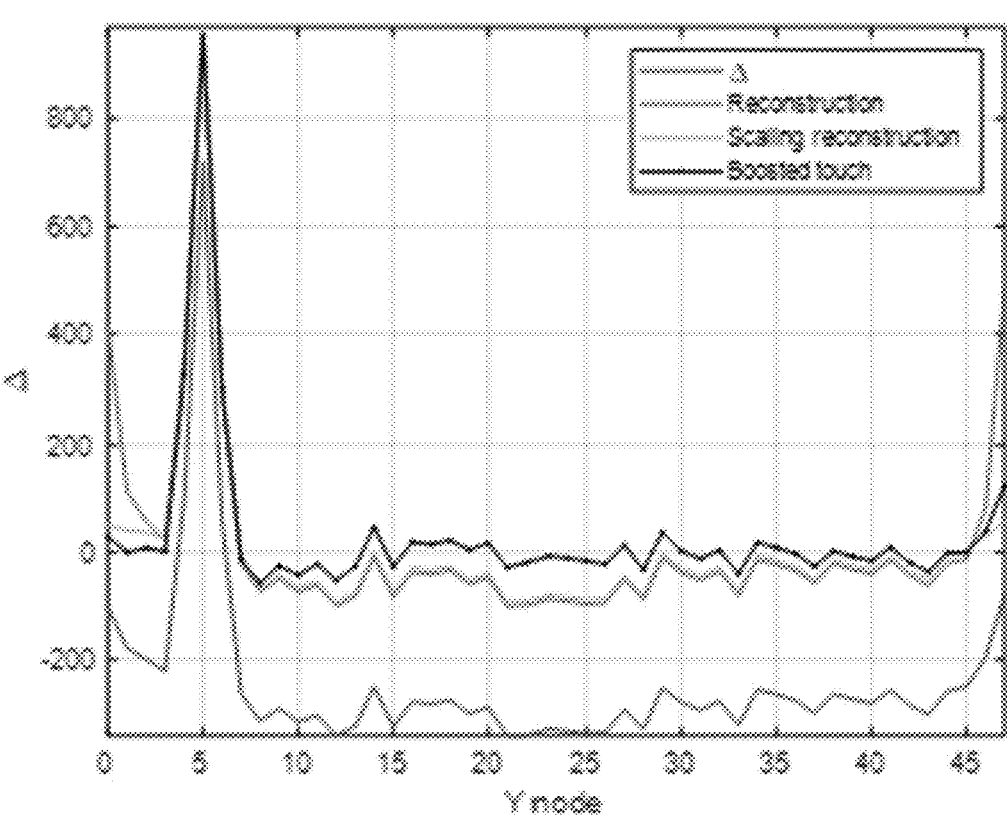

In the scenario depicted by FIG. 13 a touch event is indicated by the boosted touch signal which has a much larger amplitude than the scaling reconstruction signal and reconstruction signal. In the scenario depicted by FIG. 14 a non-touch event is indicated by the boosted touch signal generally matching the scaling reconstruction signal and reconstruction signals. In the scenario depicted by FIG. 15 a touch event is indicated by a boosted touch signal that has a larger amplitude than the scaling reconstruction signal and reconstruction signal. FIG. 15 depicts some touch (present around the Y line 5) and superimposed on the "common" signal at about −300. However, this common signal is not flat, it is "U" shaped. It is "U" shaped because the noise is not realized equally across the sensor (channel effects). Y lines to the left of the touch see less noise than Y lines to the right of the touch (in this specific non-limiting example). The common-mode noise signal may be removed, but if done without noise equalization it causes the waveform of the "reconstruction" signal depicted in FIG. 15. The U shape of the common-mode noise is visible and appears the same as the touch signal. It has the potential to be misclassified as touch—i.e., a false touch. In the specific non-limiting example depicted by FIG. 15, equalization is applied, "scaling reconstruction" signal is realized (in this specific non-limiting). The signal that could be considered a false touch is not present, but a side effect of the equalization processing is that the touch signal amplitude is reduced. When the touch signal is boosted the boosted touch signal is obtained, which (in this specific non-limiting example) has the same amplitude as the original touch signal but is not U shaped.

Figure 17:
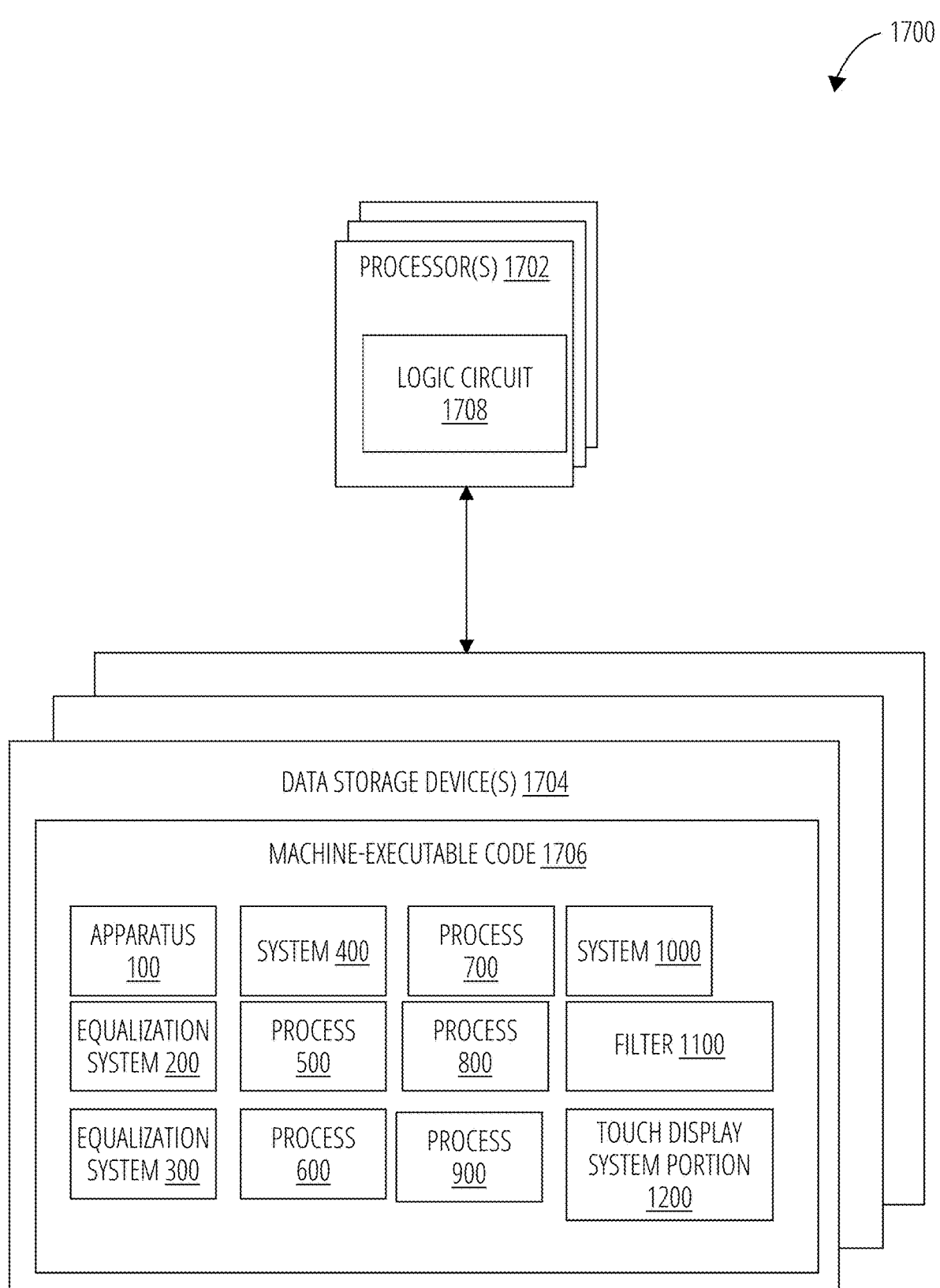
FIG. 17 is a block diagram of circuitry that, in some examples, may be used to implement various functions, operations, acts, processes, or methods disclosed herein.

It will be appreciated by those of ordinary skill in the art that functional elements of examples disclosed herein (e.g., functions, operations, acts, processes, or methods) may be implemented in any suitable hardware, software, firmware, or combinations thereof. FIG. 17 illustrates non-limiting examples of implementations of functional elements disclosed herein. In some examples, some or all portions of the functional elements disclosed herein may be performed by hardware capable of carrying out the functional elements.

FIG. 17 is a block diagram of a circuitry 1700 that, in some examples, may be used to implement various functions, operations, acts, processes, or methods disclosed herein. The circuitry 1700 includes one or more processors 1702 (sometimes referred to herein as "processors 1702") operably coupled to one or more data storage devices 1704 (sometimes referred to herein as "storage 1704"). The storage 1704 includes machine-executable code 1706 stored thereon and the processors 1702 include logic circuit 1708. The machine-executable code 1706 includes information describing functional elements that may be implemented by (e.g., performed by) the logic circuit 1708. The logic circuit 1708 is adapted to implement (e.g., perform) the functional elements described by the machine-executable code 1706. The circuitry 1700, when executing the functional elements described by the machine-executable code 1706, should be considered as special purpose hardware for carrying out functional elements disclosed herein. In one or more examples, the processors 1702 may perform the functional elements described by the machine-executable code 1706 sequentially, concurrently (e.g., on one or more different hardware platforms), or in one or more parallel process streams.

When implemented by logic circuit 1708 of the processors 1702, the machine-executable code 1706 adapts the processors 1702 to perform operations of examples disclosed herein. By way of non-limiting example, the machine-executable code 1706 may adapt the processors 1702 to perform some or a totality of operations of one or more of: process 500, process 600, process 700, process 800, or process 900.

Also by way of non-limiting example, the machine-executable code 1706 may adapt the processors 1702 to perform some or a totality of features, functions, or operations disclosed herein for one or more of: apparatus 100, equalization system 200, equalization system 300, system 400, system 1000, target signal amplifier or filter 1100, and touch display system portion 1200. More specifically, features, functions, or operations disclosed herein for one or more of: differential measurement system portion 102, equalization system 104, differential signal reconstructor 210, noise equalizer 214, filter 218, target signa amplifier 222, first noise equalizer 314, second noise equalizer 334, differential driver 310, summer 416, summer 418, subtractor 414, equalization system 424, connection block 1002, differential amplification block 1004, A/D block 1006, reconstruction block 1008, correction block 1010, filter block 1012, signal amplification block 1014, matrix 1016, pseudoinverse channel matrix 1018, matrix 1020. Also by way of non-limiting example, the machine-executable code 1706 may adapt the processors 1702 to perform some or a totality of features, functions, or operations disclosed herein for one or more of logic blocks of FIG. 11, including: multiplier parameter m, divisor parameter d, lens bending block, and the various multiplying and summing block illustrated therein.

The processors 1702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device (PLD), discrete gate or transistor logic, discrete hardware components, other programmable device, or any combination thereof designed to perform the functions disclosed herein. A general-purpose computer including one or more processors 1702, including a general-purpose processor, is considered a special-purpose computer at least while the general-purpose computer executes functional elements corresponding to the machine-executable code 1706 (e.g., software code, firmware code, configuration data, hardware descriptions, without limitation) related to examples of the present disclosure. It is noted that a general-purpose processor (which may also be referred to herein as a host processor or simply a host) may be a microprocessor, but in the alternative, a general-purpose processor of processors 1702 may include any conventional processor, controller, microcontroller, or state-machine. An FPGA or other PLD of the processors 1702 may be configured (e.g., programmed, without limitation) with configuration data to perform functions disclosed herein, or, additionally or alternatively, may be capable of being configured or re-configured (e.g., programmable, or re-programmable, without limitation) with configuration data to perform functions disclosed herein. The processors 1702 may also be implemented as a combination of computing devices, such as a combination of a DSP and a microprocessor, a plurality of microprocessors, one or more microprocessors in conjunction with a DSP core, or any other such configuration.

In one or more examples the storage 1704 includes volatile data storage (e.g., random-access memory (RAM), static RAM (SRAM), without limitation), non-volatile data storage (e.g., Flash memory, a hard disc drive, a solid-state drive, erasable programmable read-only memory (EPROM), without limitation). In some examples the processors 1702 and the storage 1704 may be implemented into a single device (e.g., a semiconductor device product, a system on chip (SOC), without limitation). In some examples the processors 1702 and the storage 1704 may be implemented into separate devices.

In one or more examples the machine-executable code 1706 may include computer-readable instructions (e.g., software code, firmware code). By way of non-limiting example, the computer-readable instructions may be stored by the storage 1704, accessed directly by the processors 1702, and executed by the processors 1702 using at least the logic circuit 1708. Also, by way of non-limiting example, the computer-readable instructions may be stored on the storage 1704, transferred to a memory device (not shown) for execution, and executed by the processors 1702 using at least the logic circuit 1708. Processors 1702 or logic circuit 1708 thereof be coupled to such a memory device or include such a memory device (e.g., a configuration memory cell, without limitation). Accordingly, in some examples the logic circuit 1708 includes electrically configurable logic circuit 1708.

In one or more examples the machine-executable code 1706 may describe hardware (e.g., circuitry) to be implemented in the logic circuit 1708 to perform the functional elements. This hardware may be described at any of a variety of levels of abstraction, from low-level transistor layouts to high-level description languages. At a high level of abstraction, a hardware description language (HDL) such as an IEEE Standard hardware description language (HDL) may be used. By way of non-limiting examples, VERILOG®, SYSTEMVERILOG™, or very large-scale integration (VLSI) hardware description language (VHDL) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuit 1708 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 1706 may include an HDL, an RTL, a GL description, a mask level description, other hardware description, or any combination thereof.

In examples where the machine-executable code 1706 includes a hardware description (at any level of abstraction), a system (not shown but including the storage 1704) implements the hardware description described by the machine-executable code 1706. By way of non-limiting example, the processors 1702 may include a programmable logic device (e.g., an FPGA or a PLC, without limitation) and the logic circuit 1708 may be electrically controlled (e.g., via configuration data, without limitation) to implement circuitry corresponding to the hardware description into the logic circuit 1708. Also, by way of non-limiting example, the logic circuit 1708 may include hard-wired logic manufactured by a manufacturing system (not shown but including the storage 1704) according to the hardware description of the machine-executable code 1706.

Regardless of whether the machine-executable code 1706 includes computer-readable instructions or a hardware description, the logic circuit 1708 is adapted to perform the functional elements described by the machine-executable code 1706 when implementing the functional elements of the machine-executable code 1706. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations to perform the actions of the module or component and/or software objects or software routines that may be stored on and/or executed by general purpose hardware (e.g., computer-readable media, processing devices, without limitation) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means "some or a totality." As used herein, the term "each and every" means a "totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples include:

Example 1: An apparatus, comprising: a differential measurement system portion to provide a first single-ended measurement signal and a second single-ended measurement signal; and an equalization system to apply pseudoinverse-based noise equalization to one or more of the first single-ended measurement signal or the second single-ended measurement signal.

Example 2: The apparatus according to Example 1, wherein the equalization system to: produce an equalized measurement signal at least partially based on a predetermined pseudoinverse channel matrix and one or more of: the first single-ended measurement signal or the second single-ended measurement signal.

Example 3: The apparatus according to any of Examples 1 and 2, wherein the equalization system comprises: a differential signal reconstructor to produce a preliminary differential measurement signal at least partially based on a single-ended measurement input signal, the single-ended measurement input signal at least partially based on a difference between the first single-ended measurement signal and the second single-ended measurement signal; and a noise equalizer to produce a differential measurement signal at least partially based on the preliminary differential measurement signal and a predetermined pseudoinverse channel matrix.

Example 4: The apparatus according to any of Examples 1 through 3, wherein the equalization system comprises: an artifact filter to reduce artifacts in the differential measurement signal produced by the noise equalizer.

Example 5: The apparatus according to any of Examples 1 through 4, wherein the equalization system comprises: a target signal amplifier to amplify a target signal in a filtered differential measurement signal produced by the artifact filter to produce an amplified differential measurement signal.

Example 6: The apparatus according to any of Examples 1 through 5, wherein coefficients of the predetermined pseudoinverse channel matrix are set to reduce channel effects.

Example 7: The apparatus according to any of Examples 1 through 6, wherein to produce the equalized measurement signal at least partially based on the predetermined pseudoinverse channel matrix, the equalization system to multiply the predetermined pseudoinverse channel matrix with one or more of: the first single-ended measurement signal or the second single-ended measurement signal.

Example 8: The apparatus according to any of Examples 1 through 7, wherein one or more channels of the differential measurement system portion include physical asymmetries.

Example 9: The apparatus according to any of Examples 1 through 8, wherein the equalization system comprises: a first noise equalizer to produce an equalized first single-ended measurement signal at least partially based on the first single-ended measurement signal; a second noise equalizer to produce an equalized second single-ended measurement signal at least partially based on the second single-ended measurement signal; and a differential driver to produce a differential measurement signal at least partially based on the equalized first single-ended measurement signal and the equalized second single-ended measurement signal.

Example 10: The apparatus according to any of Examples 1 through 9, wherein the first noise equalizer to produce the equalized first single-ended measurement signal at least partially based on a first predetermined pseudoinverse channel matrix, and the second noise equalizer to produce the equalized second single-ended measurement signal at least partially based on a second predetermined pseudoinverse channel matrix.

Example 11: The apparatus according to any of Examples 1 through 10, wherein the differential measurement system portion includes a differential amplification block to produce an analog single-ended difference signal at least partially based on a difference between the first single-ended measurement signal and the second single-ended measurement signal.

Example 12: The apparatus according to any of Examples 1 through 11, wherein the differential measurement system portion includes a connection block to receive the first single-ended measurement signal and the second single-ended measurement signal.

lowUS 12,675,189 B2

25                                                        26

Example 13: The apparatus according to any of Examples
   1 through 12, wherein the differential measurement
   system portion includes physical channels to respec-
   tively carry the first single-ended measurement signal
   and the second single-ended measurement signal,
   wherein the connection block operable to be coupled
   with the physical channels.
Example 14: The apparatus according to any of Examples
   1 through 13, wherein the equalization system com-
   prises: an analog-to-digital conversion block to pro-
   duce a digital single-ended difference signal at least
   partially based on the analog single-ended difference
   signal; a reconstruction block to produce an uncor-
   rected reconstructed differential signal at least partially
   based on the digital single-ended difference signal; and
   a correction block to produce a differential measure-
   ment signal at least partially based on the uncorrected
   reconstructed differential signal.
Example 15: A method, comprising: obtaining a first
   single-ended measurement signal and a second single-
   ended measurement signal; and producing an equalized
   measurement signal at least partially based on a pre-
   determined pseudoinverse channel matrix and one or
   more of: the first single-ended measurement signal and
   the second single-ended measurement signal.
Example 16: The method according to Example 15,
   wherein coefficients of the predetermined pseudoin-
   verse channel matrix are set to reduce channel effects.
Example 17: The method according to any of Examples
   15 and 16, comprising: producing a single-ended mea-
   surement input signal at least partially based on a
   relationship between the first single-ended measure-
   ment signal and the second single-ended measurement
   signal; and producing the equalized measurement sig-
   nal at least partially based on the predetermined pseu-
   doinverse channel matrix and the single-ended mea-
   surement input signal.
Example 18: The method according to any of Examples
   15 through 17, wherein producing the equalized mea-
   surement signal comprises: producing a first single-
   ended equalized measurement signal at least partially
   based on the first single-ended measurement signal and
   a first predetermined pseudoinverse channel matrix of
   the predetermined pseudoinverse channel matrix; pro-
   ducing a second single-ended equalized measurement
   signal at least partially based on the second single-
   ended measurement signal and a second predetermined
   pseudoinverse channel matrix of the predetermined
   pseudoinverse channel matrix; and producing a differ-
   ential measurement signal at least partially based on the
   first single-ended equalized measurement signal and
   the second single-ended equalized measurement signal.
Example 19: The method according to any of Examples
   15 through 18, wherein producing a first single-ended
   equalized measurement signal comprises multiplying
   the first single-ended measurement signal with the first
   predetermined pseudoinverse channel matrix.
Example 20: The method according to any of Examples
   15 through 19, and wherein producing a second single-
   ended equalized measurement signal comprises multi-
   plying the second single-ended measurement signal
   with the second predetermined pseudoinverse channel
   matrix.
Example 21: A system, comprising: a display; a touch
   sensor comprising X electrodes and Y electrodes; and
   an equalization system to produce equalized mutual
   capacitance measurement signals at least partially based on single-ended measurement signals received
   via the Y electrodes of the touch sensor during a mutual
   capacitance measurement.
Example 22: The system according to Example 21,
   wherein at least some lines of the X electrodes or lines
   of the Y electrodes exhibit nonuniform spatial distri-
   bution of noise intensity or noise characteristics.
Example 23: The system according to any of Examples 21
   and 22, wherein the X electrodes or Y electrodes
   comprise lines of nonuniform length.
Example 24: The system according to any of Examples 21
   through 23, wherein the X electrodes or Y electrodes
   comprise nonuniform numbers of sensor nodes.
   While the present disclosure has been described herein
with respect to certain illustrated examples, those of ordi-
nary skill in the art will recognize and appreciate that the
present invention is not so limited. Rather, many additions,
deletions, and modifications to the illustrated and described
examples may be made without departing from the scope of
the invention as hereinafter claimed along with their legal
equivalents. In addition, features from one example may be
combined with features of another example while still being
encompassed within the scope of the invention as contem-
plated by the inventor.

What is claimed is:
   1. An apparatus, comprising:
   a differential measurement circuit to provide a first single-
      ended measurement signal carried over a first physical
      channel of the differential measurement circuit and a
      second single-ended measurement signal carried over a
      second physical channel of the differential measure-
      ment circuit; and
   an equalization circuit to apply pseudoinverse-based
      noise equalization to one or more of the first single-
      ended measurement signal or the second single-ended
      measurement signal, wherein the pseudoinverse-based
      noise equalization comprises utilization of a predeter-
      mined pseudoinverse channel matrix at least partially
      based on a Singular Value Decomposition (SVD) of a
      channel matrix.
   2. The apparatus of claim 1, wherein the equalization
circuit to:
   produce an equalized measurement signal at least partially
      based on the predetermined pseudoinverse channel
      matrix and one or more of: the first single-ended
      measurement signal or the second single-ended mea-
      surement signal.
   3. The apparatus of claim 2, wherein coefficients of the
predetermined pseudoinverse channel matrix are set to
reduce channel effects.
   4. The apparatus of claim 2, wherein to produce the
equalized measurement signal at least partially based on the
predetermined pseudoinverse channel matrix, the equaliza-
tion circuit to multiply the predetermined pseudoinverse
channel matrix with one or more of: the first single-ended
measurement signal or the second single-ended measure-
ment signal.
   5. The apparatus of claim 1, wherein one or more channels
of the differential measurement circuit include physical
asymmetries.
   6. The apparatus of claim 1, wherein the differential
measurement circuit includes a differential amplification
block to produce an analog single-ended difference signal at
least partially based on a difference between the first single-
ended measurement signal and the second single-ended
measurement signal.

7. The apparatus of claim 6, wherein the differential measurement circuit includes a connection block to receive the first single-ended measurement signal and the second single-ended measurement signal.

8. The apparatus of claim 7, wherein the connection block operable to be coupled with the first physical channel and the second physical channel of the differential measurement circuit.

9. The apparatus of claim 6, wherein the equalization circuit comprises:

an analog-to-digital conversion block to produce a digital single-ended difference signal at least partially based on the analog single-ended difference signal;

a reconstruction block to produce an uncorrected reconstructed differential signal at least partially based on the digital single-ended difference signal; and a correction block to produce a differential measurement signal at least partially based on the uncorrected reconstructed differential signal.

10. An apparatus, comprising:

a differential measurement circuit to provide a first single-ended measurement signal and a second single-ended measurement signal; and an equalization circuit to apply pseudoinverse-based noise equalization to one or more of the first single-ended measurement signal or the second single-ended measurement signal, wherein the equalization circuit to produce an equalized measurement signal at least partially based on a predetermined pseudoinverse channel matrix and one or more of: the first single-ended measurement signal or the second single-ended measurement signal, and wherein the equalization circuit comprises:

a differential signal reconstructor to produce a preliminary differential measurement signal at least partially based on a single-ended measurement input signal, the single-ended measurement input signal at least partially based on a difference between the first single-ended measurement signal and the second single-ended measurement signal; and a noise equalizer to produce a differential measurement signal at least partially based on the preliminary differential measurement signal and a predetermined pseudoinverse channel matrix.

11. The apparatus of claim 10, wherein the equalization circuit comprises:

an artifact filter to reduce artifacts in the differential measurement signal produced by the noise equalizer.

12. The apparatus of claim 11, wherein the equalization circuit comprises:

a target signal amplifier to amplify a target signal in a filtered differential measurement signal produced by the artifact filter to produce an amplified differential measurement signal.

13. An apparatus, comprising:

a differential measurement circuit to provide a first single-ended measurement signal and a second single-ended measurement signal; and an equalization circuit to apply pseudoinverse-based noise equalization to one or more of the first single-ended measurement signal or the second single-ended measurement signal, wherein the equalization circuit to produce an equalized measurement signal at least partially based on a predetermined pseudoinverse channel matrix and one or more of: the first single-ended measurement signal or the second single-ended measurement signal, and wherein the equalization circuit comprises:

a first noise equalizer to produce an equalized first single-ended measurement signal at least partially based on the first single-ended measurement signal;

a second noise equalizer to produce an equalized second single-ended measurement signal at least partially based on the second single-ended measurement signal; and a differential driver to produce a differential measurement signal at least partially based on the equalized first single-ended measurement signal and the equalized second single-ended measurement signal.

14. The apparatus of claim 13, wherein the first noise equalizer to produce the equalized first single-ended measurement signal at least partially based on a first predetermined pseudoinverse channel matrix, and the second noise equalizer to produce the equalized second single-ended measurement signal at least partially based on a second predetermined pseudoinverse channel matrix.

15. A method, comprising:

obtaining a first single-ended measurement signal and a second single-ended measurement signal carried a first physical channel of a differential measurement circuit and a second physical channel of the differential measurement circuit, respectively; and producing an equalized measurement signal at least partially based on a predetermined pseudoinverse channel matrix and one or more of: the first single-ended measurement signal and the second single-ended measurement signal, the predetermined pseudoinverse channel matrix at least partially based on a Singular Value Decomposition (SVD) of a channel matrix.

16. The method of claim 15, wherein coefficients of the predetermined pseudoinverse channel matrix are set to reduce channel effects.

17. The method of claim 15, comprising:

producing a single-ended measurement input signal at least partially based on a relationship between the first single-ended measurement signal and the second single-ended measurement signal; and producing the equalized measurement signal at least partially based on the predetermined pseudoinverse channel matrix and the single-ended measurement input signal.

18. A method, comprising:

obtaining a first single-ended measurement signal and a second single-ended measurement signal; and producing an equalized measurement signal at least partially based on a predetermined pseudoinverse channel matrix and one or more of: the first single-ended measurement signal and the second single-ended measurement signal, wherein producing the equalized measurement signal comprises:

producing a first single-ended equalized measurement signal at least partially based on the first single-ended measurement signal and a first predetermined pseudoinverse channel matrix of the predetermined pseudoinverse channel matrix;

producing a second single-ended equalized measurement signal at least partially based on the second single-ended measurement signal and a second predetermined pseudoinverse channel matrix of the predetermined pseudoinverse channel matrix; and producing a differential measurement signal at least partially based on the first single-ended equalized measurement signal and the second single-ended equalized measurement signal.

19. The method of claim 18, wherein producing a first single-ended equalized measurement signal comprises multiplying the first single-ended measurement signal with the first predetermined pseudoinverse channel matrix.

20. The method of claim 18, wherein producing a second single-ended equalized measurement signal comprises multiplying the second single-ended measurement signal with the second predetermined pseudoinverse channel matrix.

\* \* \* \* \*

30